US009045846B2

(12) United States Patent
Lecostaouec et al.

(10) Patent No.: US 9,045,846 B2
(45) Date of Patent: Jun. 2, 2015

(54) SPIRAL TEXTILE AND SYSTEM FOR WEAVING THE SAME

(71) Applicants: Jean-Francois Lecostaouec, Pueblo West, CO (US); Felix Binder, Frick (CH)

(72) Inventors: Jean-Francois Lecostaouec, Pueblo West, CO (US); Felix Binder, Frick (CH)

(73) Assignee: Goodrich Corporation, Charlotte, NC (US)

(*) Notice: Subject to any disclaimer, the term of this patent is extended or adjusted under 35 U.S.C. 154(b) by 23 days.

(21) Appl. No.: 13/706,168

(22) Filed: Dec. 5, 2012

(65) Prior Publication Data

US 2014/0150922 A1 Jun. 5, 2014

(51) Int. Cl.
| | |
|---|---|
| *D03D 5/00* | (2006.01) |
| *D03D 47/40* | (2006.01) |
| *D03D 1/00* | (2006.01) |
| *D03D 3/00* | (2006.01) |
| *D03D 3/08* | (2006.01) |

(Continued)

(52) U.S. Cl.
CPC .................. *D03D 1/00* (2013.01); *D03D 3/005* (2013.01); *D03D 3/08* (2013.01); *D03D 13/008* (2013.01); *D03D 35/00* (2013.01); *D03D 49/20* (2013.01); *D10B 2101/12* (2013.01); *D10B 2505/02* (2013.01)

(58) Field of Classification Search
CPC ......... D04H 18/02; D04H 18/00; D04H 3/02; D04H 1/4242; D04H 1/498; D04H 3/04; D04H 3/105; D04H 1/46; D04H 1/559; D04H 3/07; D04H 13/005; D04H 1/48; D04H 3/045; D04H 3/10; D03D 13/00; D03D 15/00; D03D 3/08; D03D 25/005; D10B 2101/12

See application file for complete search history.

(56) References Cited

U.S. PATENT DOCUMENTS 4,022,034 A * 5/1977 Matsuda ...................... 66/169 R
5,141,031 A * 8/1992 Baurmeister ............. 139/383 R (Continued)

FOREIGN PATENT DOCUMENTS

EP 0528336 2/1993
EP 0683261 11/1995

(Continued)

OTHER PUBLICATIONS

"Shed." Dictionary.com Unabridged. Random House, Inc. Nov. 10, 2014. <Dictionary.com http://dictionary.reference.com/browse/shed>.*

(Continued)

*Primary Examiner* — Bobby Muromoto, Jr.
(74) *Attorney, Agent, or Firm* — Snell & Wilmer, L.L.P.

(57) ABSTRACT

Loom configurations and methods for efficiently manufacturing unique spiral-shaped fabrics. The loom introducing two weft yarn segments in the form of a continuous loop in each shed may be configured with one or two weft needles and is equipped with a knitting system to form a knitted selvedge along the outside circumference of the fabric. The knitted edge is used as reference to form weft yarn loops of different lengths. The opposite weft yarn loops are permanently secured around selected warp yarns. Alternatively intermediate length weft yarn loops may be created where the extremity of the loop is not bound to any warp yarn. Fiber architectures may be designed and woven which exhibit uniform fiber volume across the width of the fabric. Fiber architectures with greater fiber volume along the outside circumference of the fabric may also be prepared.

17 Claims, 20 Drawing Sheets

(51) Int. Cl.
*D03D 35/00* (2006.01)
*D03D 49/20* (2006.01)
*D03D 13/00* (2006.01)

(56) References Cited

U.S. PATENT DOCUMENTS

| | | | |
|---|---|---|---|
| 5,168,000 A * | 12/1992 | Reinhard et al. | 428/193 |
| 5,242,745 A * | 9/1993 | Aucagne et al. | 442/205 |
| 5,312,660 A * | 5/1994 | Morris et al. | 428/36.3 |
| 5,546,880 A * | 8/1996 | Ronyak et al. | 112/475.01 |
| 5,662,855 A * | 9/1997 | Liew et al. | 264/258 |
| 5,758,394 A | 6/1998 | Linck et al. | |
| 5,952,075 A | 9/1999 | Clarke et al. | |
| 6,009,605 A | 1/2000 | Olry et al. | |
| 6,105,223 A | 8/2000 | Brown et al. | |
| 6,183,583 B1 | 2/2001 | Duval et al. | |
| 6,248,417 B1 | 6/2001 | Ponsolle et al. | |
| 6,319,348 B1 | 11/2001 | Olry et al. | |
| 6,347,440 B1 | 2/2002 | Duval et al. | |
| 6,363,593 B1 | 4/2002 | Duval et al. | |
| 6,367,130 B1 | 4/2002 | Duval et al. | |
| 7,185,404 B2 | 3/2007 | Delecroix | |
| 7,251,871 B2 | 8/2007 | Delecroix et al. | |
| 2003/0205213 A1 * | 11/2003 | Aquino et al. | 123/241 |
| 2005/0172465 A1 * | 8/2005 | Duval | 28/101 |
| 2006/0090314 A1 * | 5/2006 | Delecroix | 28/100 |
| 2011/0154629 A1 | 6/2011 | Delecroix | |
| 2011/0275266 A1 * | 11/2011 | Lecostaouec | 442/240 |
| 2011/0294386 A1 * | 12/2011 | Kockritz et al. | 442/320 |
| 2013/0236686 A1 * | 9/2013 | Horibe et al. | 428/114 |

FOREIGN PATENT DOCUMENTS

| | | |
|---|---|---|
| EP | 1357211 | 10/2003 |
| FR | 2414087 | 8/1979 |
| FR | 2643656 | 8/1990 |
| JP | 5673138 | 6/1981 |
| WO | 2007048946 | 5/2007 |

OTHER PUBLICATIONS

European Search Report dated Mar. 18, 2014 in European Application No. 13192961.4.
Office Action dated Aug. 24, 2012 in U.S. Appl. No. 12/774,119.
Restriction Requirement dated Jun. 6, 2012 in U.S. Appl. No. 12/774,119.
GB; Search Report dated Sep. 23, 2010 in Application No. GB1009785.5.
GB; Further Search Report dated Feb. 8, 2011 in Application No. GB1009785.5.

* cited by examiner

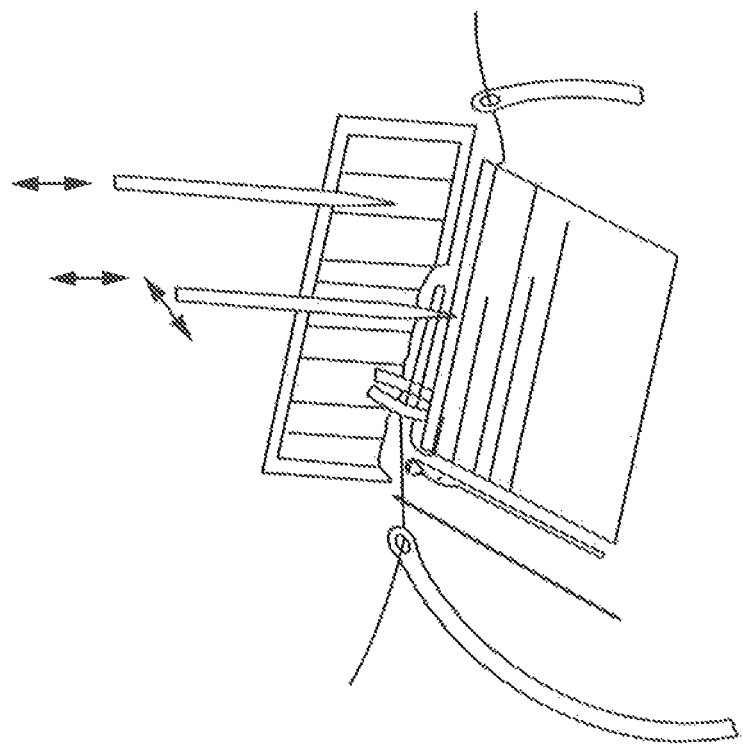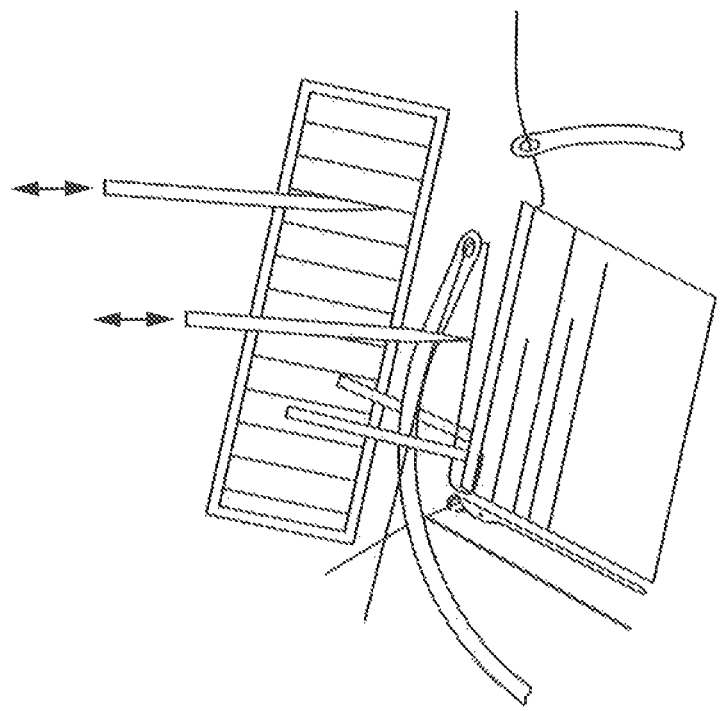

SPIRAL TEXTILE AND SYSTEM FOR WEAVING THE SAME

FIELD OF INVENTION

This invention is generally related methods, apparatus and manufacturing associated with a spiral textile, and more particularly, to a spiral textile having a uniform radial fiber content and/or a higher radial fiber content along the outside perimeter of the textile.

BACKGROUND OF THE INVENTION

Carbon/carbon ("C/C") parts are employed in various industries. An exemplary use for C/C parts includes using them as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat, and thus, is able to dissipate heat away from the braking surfaces that is generated in response to braking. C/C material is also highly resistant to heat damage, and is capable of sustaining friction between brake surfaces during severe braking, without a significant reduction in the friction coefficient or mechanical failure.

Today's prevalent commercial approach to prepare fibrous preform structures for manufacturing carbon-carbon brake disks is to needle-punch layers of OPF PAN fibers in a board shape from which donut shape preforms are cut. The preforms are subsequently subjected to a costly carbonization cycle to transform the fiber into carbon. This approach yields a large amount of fiber waste. A more effective method to fabricate the fibrous preform structure is to organize carbonized fibers with a suitable fiber architecture in a continuous handleable spiral shape fabric. The carbon fiber narrow fabric is subsequently fed into a circular needle punch machine to prepare a three dimensional textile.

Various technologies exist for fabricating a continuous spiral fabric by modifying a conventional weaving loom such as a rapier or shuttle loom. Conical take-off rollers are used to control the take-up advance of the various warp yarns to form the specific geometry of the spiral fabric. The shuttle loom offers some weave architecture flexibility but does not allow a seamless continuous process as it requires costly repackaging of the yarn. Thus, weaving with a shuttle loom is generally highly inefficient.

Rapier loom technology also has undesirable limitations. For example rapier looms generally transport the weft fibers across the full width of the fabric. This type of weaving may result in non-uniformity of the fiber spacing at various circumferences across the radius of a spiral textile. In this regard, spiral-shaped textiles prepared with weft fibers that solely extend across the entire width of the textile tape generally exhibit a deficiency in that the density of the weft fibers decreases moving from the inside diameter of the spiral-shaped textile to the outside diameter of the textile (i.e., in the radial direction).

For example, with reference to FIG. 1, a prior art spiral-shaped textile is illustrated. Because the number of weft fibers extending from the inner diameter or second edge of the textile to the outer diameter or first edge of the textile is the same, the radial fiber content ($\delta$) is lower at the outer diameter ($\delta_{OD}$) than the radial fiber content at the inner diameter ($\delta_{ID}$). Stated another way, the concentration of the weft fibers, or the weft fiber density, at the inner diameter is greater than the concentration of the weft fibers at the outer diameter because the circumference at the inner diameter is shorter than the circumference at the outer diameter, but the same number of weft fibers are present at both circumferences. Such a fiber architecture may result in a number of shortcomings during subsequent processing and in the mechanical and thermal properties of the final product.

The formation of continuous spiral and/or helical fabrics using conventional weaving looms and conical take up rollers has been pursued due to an interest in carbon and ceramic fiber textiles with fibers oriented in radial and circumferential orientations to prepare donut shape components like turbine rotors.

Current methods for fabricating a continuous helical fabric with suitable fiber orientation for brake applications or other thermo-structural applications are not economical because they typically employ a shuttle loom to weave the helical fabric. In a shuttle loom (see, e.g., FIGS. 2A-2B), the shuttle transports the continuous weft yarn through the open shed from a so called starting warp yarn defining the outer circumference of the helical fabric. The formation of the subsequent shed is designed to allow looping the same weft yarn around a selected so-called reference warp yarn during the return of the shuttle to its starting position. This technology is inherently slow and poorly adapted to large scale and/or mass production of narrow helical fabrics. Shuttle looms are designed for weaving of broad goods, and may only accommodate the fabrication of one helical tape at a time. Furthermore one drawback of a shuttle loom is that small amounts of yarn need to be repackaged on special bobbins or quills which fit in the shuttle. This technology also has upper limits on yarn size, which further negatively affects weaving speed. The larger the tow the more fiber damage takes place during winding and un-winding of the tow to and from the shuttle bobbin, so the shuttle technology is generally limited to weft carbon tows no larger than 12 K.

Newer weaving technology such as narrow fabric needle looms are capable of operating at very high speed thanks to a short travel of the weft insertion device and the effective introduction of two weft yarn segments of the same weft yarn at each weft needle insertion. These looms typically equipped with one weft needle are generally use to manufacture narrow straight fabrics with low denier yarns such as ribbons and are not configured for manufacturing spiral-shaped textiles or handling larger yarn in the weft direction.

Moreover, certain narrow fabric needle looms have two or more needles configured to introduce weft yarns in separate sheds, thus creating pockets across the width of the tape. However, these multiple needles are configured to dispose the weft yarns over a fixed length across the width of the textile.

A circular needle-punching loom may be utilized to form a circular preform from spiral textiles, for example, for use in creating carbon brake disks. Various textile technologies exist for fabricating a continuous carbon feed form for a circular needle loom, including yarn placement, stitch bonding, pre-needling, and conventional loom weaving with conical take-up rolls. Narrow fabric needle looms, with suitable modification to transport larger textile tows in the weft direction and with an alternate take-off system, may be utilized to produce a continuous spiral textile tape to be utilized in a circular needle-punching loom to form a circular preform. These spiral textiles may contain warp fibers which lie along the length of the textile, and weft fibers which lie along the width of the textile.

Significantly, some prior art mechanisms and methods for transporting a spiral textile from a loom (where the textile is woven) to a circular needle-punching loom require much more space in order to deliver the spiral textile in a complex path to the circular needle loom. This complex path is utilized in order to maintain the weave and overall shape of a spiral textile from the time it leaves the fabric needle loom to the time it is deposited in the circular needle loom. For example, the spiral textile may by layered horizontally on a vertical spool from the weaving loom as illustrated in FIG. 3, such that it is removed from the spool and oriented to be disposed horizontally on a circular needle loom. As can be appreciated, such a configuration requires that the textile tape change directions from the spool to the circular needle loom, resulting in a circuitous path from the spool to the loom. Further, unwinding the spiral fabric from the horizontal plane on the top layer of the vertical spool to the horizontal plane of the circular needle loom may be challenging.

Accordingly, there is a need for developing an economical technology to manufacture, on a large scale, a narrow fabric product in the form of a continuous helical tape constructed with carbon, ceramic and/or other fibers. Furthermore, a fiber architecture is desirable that has a reasonable homogeneous fiber content across the fabric width to facilitate further processing and to yield suitable properties. Additionally, a reasonably consistent thickness of the fabric across the textile width is desirable during needle punching. In the case of a carbon brake disk application, it may be desirable to obtain a higher ratio of radial to circumferential reinforcement to draw out heat along the radial direction, thus a fabric with a higher weft to warp fiber content may be desirable.

Furthermore, it is desirable to develop a narrow fabric needle loom for producing spiral-shaped textiles which are capable of providing a more consistent radial fiber content across the radius of the spiral-shaped textile. Additionally, it is desirable to develop a loom with one or multiple needles that are configured to dispose weft yarns of variable lengths across the width of the textile. Further still, it is desirable to develop a system and method for manufacturing a continuous carbon feed form at a higher manufacturing speed.

Moreover, it is desirable to provide a mechanism and method to efficiently collect the spiral fabric from a weaving station, transport it to a circular needle loom and continuously feed the spiral fabric to the bed plate of the circular needle loom. It is further desirable to reduce the amount of space used to transport the spiral textile. Additionally, it is desirable to transport the spiral textile tape while reducing distortions in the weave of the spiral textile that are generated in existing spiral textile transport mechanisms.

SUMMARY

In order to address the deficiencies outlined above, according to various embodiments, a narrow fabric needle loom is fitted with one or two needle drive mechanisms to drive one or two weft needles. Depending on the loom configuration, one needle versus two needles, the loom may be equipped with one or two weft yarn feeding system(s) and moveable fingers mechanically or electronically activated to intercept the weft yarn between the reed and the fell of the fabric upon return of the weft needle. The loom further comprises conical take-off rollers which control the geometry of the spiral-shaped textile.

In various embodiments, the loom further comprises a knitting system including a latch needle, a binder thread inserter and a binder thread delivery system to provide a mechanism to secure the weft yarn loops along one edge of the fabric. The knitting system is best located proximate the large diameter of the conical take-off roller. A conical spool is also proposed to directly wind the fabric in a suitable package.

In accordance with various embodiments, a helical shaped textile comprises warp fibers spaced in a weft direction and a succession of weft fiber loops of various lengths. The length of the weft fiber loops are defined from a reference knitted selvedge edge situated along the outside edge of the textile and also referred to as first edge. The weft fiber loops are temporarily or permanently secured between the first and second edge of the textile. Various patterns of weft fiber loops are implemented to achieve a uniform radial fiber content across the width of the fabric. Alternatively fiber architectures with a higher radial content along the outer edge of the fabric are built, overall fiber content is maintained by decreasing the warp fiber content from the inside to the outside edge of the fabric.

Depending on the loom configuration selected, one versus two weft needles, the building of the various picks are different. In the case of one weft needle each pick of the textile contained one segment of first weft fibers loop and one segment of second weft fiber loop. In the case of two opposite weft needles some picks contained one segment of first weft fiber loop and one segment of third weft fiber loop and some picks contained both segments of second and fourth weft fiber loops.

A method for manufacturing a spiral-shaped textile, in accordance with various embodiments with one weft needle, comprises inserting weft fibers in warps shed; securing the weft fibers primary loops at the first edge using a knitting system. The weft needle is retracted and one segment of the first weft fibers loop is beaten along the fell of the fabric with the other segment of weft fibers. A full length first weft fibers loop is built by alternating the shed position of the first warp yarn along the second edge from the previous position. Upon re-introduction of the weft needle in the warp shed the second segment of the first weft fiber loops is built and secured along the second edge by looping around the first warp and along the first edge by a knitted loops. Upon retraction of the weft needle the first segment of the second weft fibers loop is built. A partial length second weft fibers loop is realized by maintaining the shed position of the first several warp yarns along the second edge during the subsequent weft needle insertion. The steps are repeated using pre-selected shed openings to achieve desired fiber architecture with various weft fibers lengths.

Geometry of the fabric is defined by the position of the fabric on the take-off rollers and the geometry of the take-off rollers.

A method for manufacturing a spiral-shaped textile, in accordance with various embodiments with two weft needles and moveable fingers. The first full length weft fibers loop is built during three selected warps sheds from a first edge of the textile to a second edge of the textile. The various weft yarn loops from the first weft fibers are secured in a similar way as the embodiment with one weft needle. The second partial length weft fibers loop is introduced during the second warp sheds. Length of the second weft fibers loop is defined by the position of movable fingers acting between the reed and the fell of the fabric. The steps are repeated using pre-selected shed openings to achieve desired fiber architecture with various weft fibers lengths.

According to various embodiments, a reel is provided for winding the spiral fabric as it is woven. The reel or spool comprises a first hub and a second hub between which the spiral textile may be wound. The reel further comprises a barrel upon which the spiral textile is wound, and the barrel may be disposed between the first hub and the second hub.

The barrel further comprises a first end with a first diameter and a second end with a second diameter that is different than the first diameter.

In various embodiments, the barrel is a frustum of a cone, and the spiral textile unwinds from the barrel and is disposed on a circular needle loom in substantially the same orientation and direction as the spiral textile is wound on the barrel. For example, to facilitate disposing the spiral textile on the circular needle loom, a face of the textile is substantially parallel to the barrel. Furthermore, the first hub and second hub may allow the reel to store an amount of the spiral textile sufficient to produce one or more circular preforms.

BRIEF DESCRIPTION OF THE DRAWINGS

The system and/or method may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers and yarns (and their orientations) in practice are very small and closely packed, the figures herein may show exaggerated fiber width and spacing in order to more clearly illustrate the fiber orientations.

FIGS. 8A1, 8A2, and 8B illustrates fingers and separate movement of two needles, according to various embodiments;

DETAILED DESCRIPTION

Figure 1:
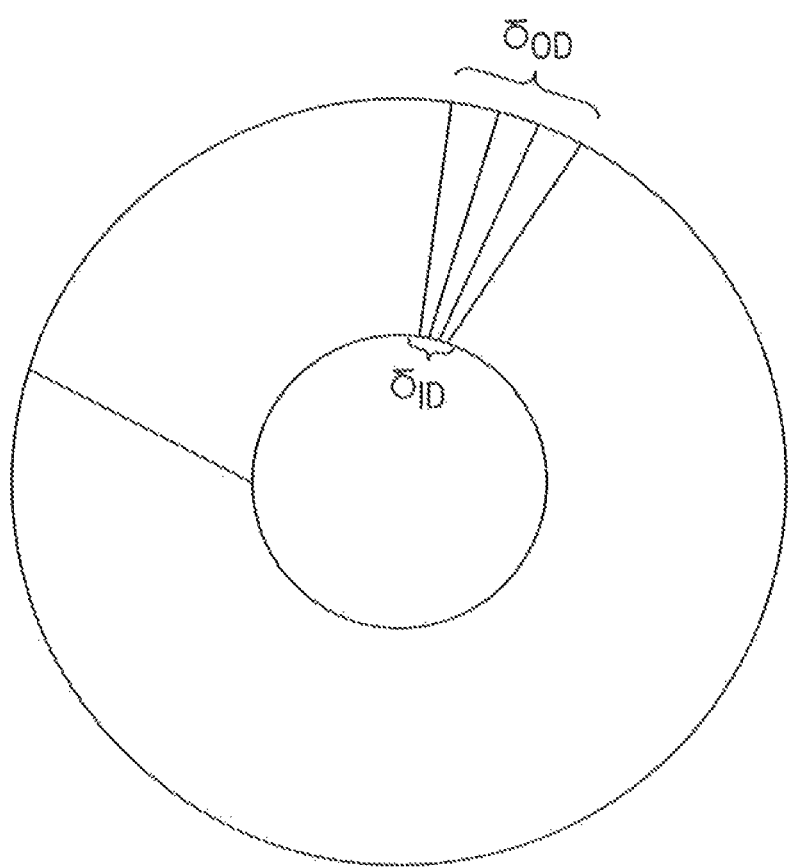
FIG. 1 illustrates a prior art spiral-shaped textile.
Figure 2A:
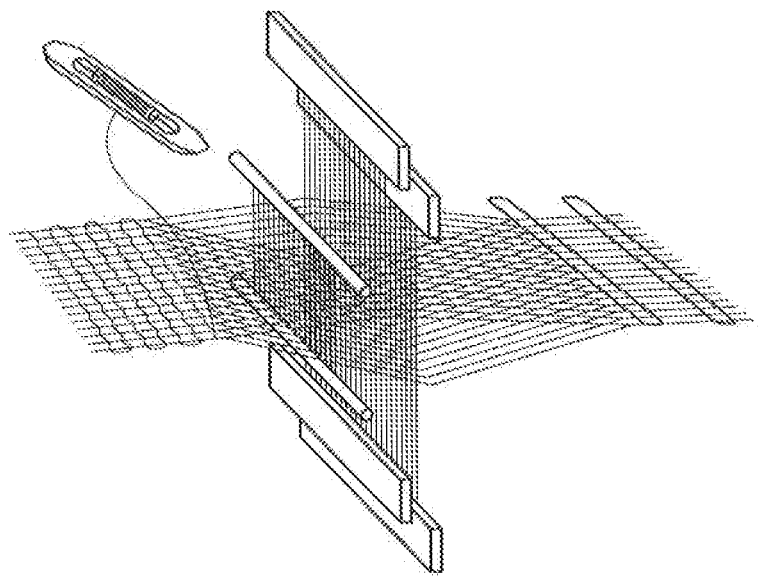
FIGS. 2A-2B illustrate prior art shuttle looms.
Figure 2A:
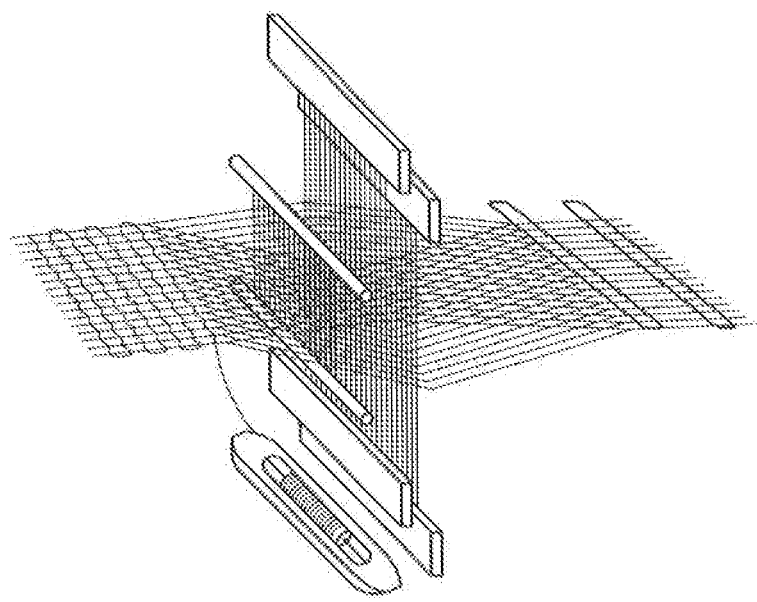
Figure 2B:
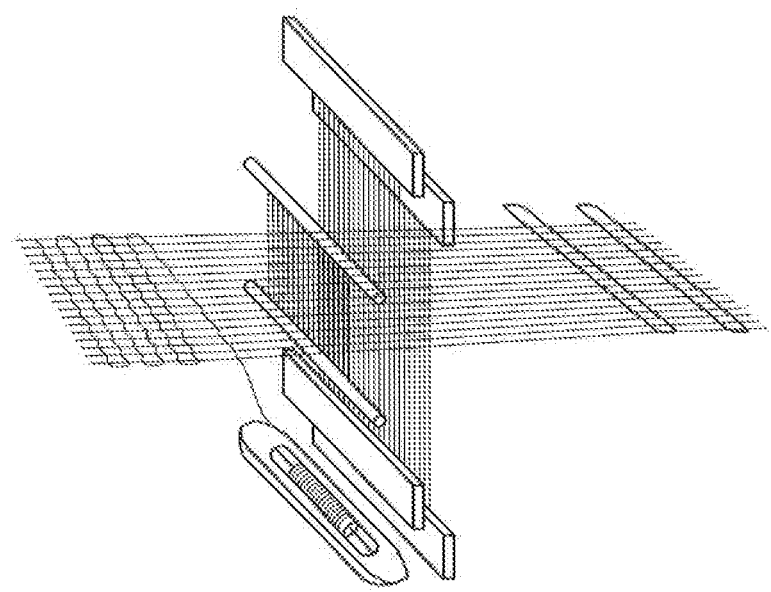
Figure 2B:
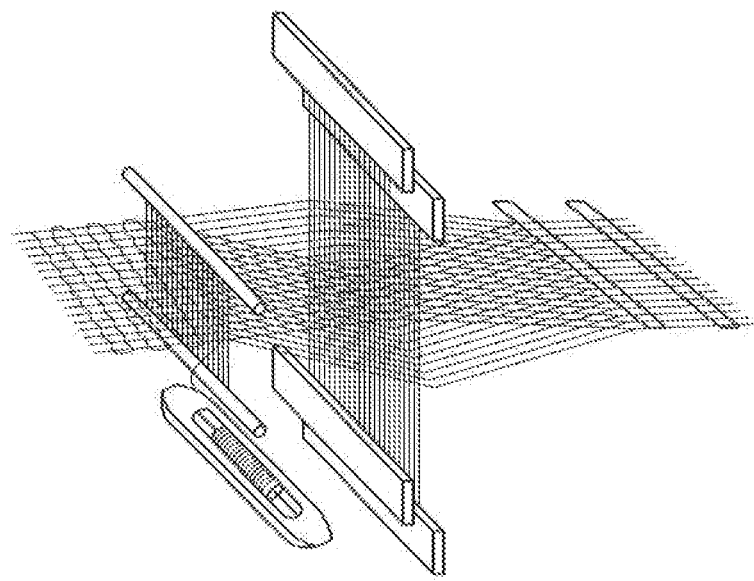

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical, electrical, and mechanical changes may be made without departing from the spirit and scope of the invention. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

Various embodiments of the disclosed system and method will now be described with reference to the appended figures, in which like reference labels are used to refer to like components throughout. The appended figures are not necessarily to scale. As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are present disclosure, and are not meant to be limiting in any fashion.

As used herein the terms "tow" and "cable" are used to refer to a strand of substantially continuous filaments. "Spiral" fabric may also be referred to herein as "helical" fabric. A "textile" may be referred to as a "fabric" or a "tape." "Circular needle loom" may be used to identify or describe a "circular needle punching loom." A "fabric needle loom" or "tape needle loom" may be used to identify or describe a "narrow fabric needle loom or needle weaving machine."

As used herein, the term "yarn" is used to refer to a strand of substantially continuous fibers or staple fibers or blends of these; thus the term "yarn" encompasses tow and cable. For example, a "heavy tow" may comprise about 50,000 (50K) textile fibers in a single tow, whereas a "lighter tow" may comprise about 12,000 (12K) textile fibers within a single tow. Fewer or greater amounts of textile fibers may be used per cable in various embodiments. In various embodiments disclosed herein, the weaving needles are capable of weaving tows comprising 6K or more textile fibers in a single tow, for example, 12K, 24K, 48K, 50K, and heavier tows. As is understood, "warp" fibers are fibers that lie in the "warp" direction in the textile—i.e., along the length of the textile. "Weft" fibers are fibers that lie in the "weft" direction in the textile—i.e., along the width of the textile. Warp fibers may be described as being spaced apart with respect to the weft direction (i.e., spaced apart between the OD and ID of the textile). Similarly, the weft fibers may be described as being spaced apart with respect to the warp direction.

In accordance with various embodiments the term weft fibers is used to describe a portion of the continuous weft yarn within the fabric. The weft needle of narrow fabric needle loom may introduce a series of yarn loops through specific warp yarn sheds. The first and subsequent loops are logically defined by the point of entry and exit of the needle. This definition is applicable as the weft yarn is typically of a constant width throughout the fabric. In various embodiments having weft yarns of varied length, the weft fibers may be defined as originating from and terminating at the chosen reference of the first edge or knitted edge of the fabric. A weft fiber may constitute a portion of weft yarn containing two primary half loops held at a first edge and one secondary loop held at some distance from the first edge. In order to describe the unique fiber architectures of the fabrics achieved with the various embodiments, the term pick is used to describe the weft filling for one weft needle insertion.

In accordance with various embodiments the outer and inner circumferences of the spiral fabric may be respectively referred to as first side or knitted edge side and second side, needle entry side or woven edge.

In accordance with various embodiments, a spiral textile tape is configured to include weft fibers of varying lengths to facilitate obtaining a substantially homogeneous fiber volume, content and/or density. As noted above, spiral-shaped textiles of the prior art generally exhibit a reduced density of weft fibers at the outside diameter ("OD") of the spiral textile, as compared to the inside diameter ("ID"), due to the same number of weft fibers being distributed across an OD with a larger circumference than the ID. This reduced density at the OD may be referred to as a "deficiency" in the weft fiber density at the OD, or a lower radial fiber content at the OD than at the ID.

To address such a deficiency, according to various embodiments disclosed herein, weft fibers of different lengths may originate from the outside diameter ("OD") of the spiral textile, but only some of the weft fibers may extend to the inside diameter ("ID") of the spiral textile. Accordingly, the weft fiber density and/or radial fiber content is configured to remain substantially uniform (constant) between the textile OD and the textile ID.

Furthermore, according to various embodiments, a narrow fabric needle loom is configured to fabricate fiber architectures with a higher weft content along the outer perimeter of the fabric. Such higher weft content may facilitate extracting heat from the region where a substantial amount of work is generated during braking.

In various embodiments, a narrow fabric needle loom may be configured to more economically manufacture a continuous helical fabric tape than with shuttle or rapier looms. The narrow fabric needle loom may be configured to fabricate a helical fabric with tailorable weft to warp fiber content, for example, to meet the thermo-mechanical needs of a carbon-carbon aircraft brake disk. Furthermore, the transport mechanisms for the weft fibers and the tying of the weft fibers along one or both edges of the textile constitute improved technical approaches for preparing the targeted helical and/or spiral fiber architecture. Narrow fabric needle looms according to various embodiments, are more efficient than conventional weaving looms.

Contrary to a shuttle loom, narrow fabric needle looms, according to various embodiments, comprise an improved needle for weft fiber transport and a mechanism for tying the weft fibers along one or both edges of the textile. These features facilitate achieving a substantially seamless, continuous weaving process. For example, the carbon fiber spools, as delivered by the carbon fiber suppliers, can be set-up for direct weft delivery without re-spooling, as is generally required for shuttle loom weaving.

In accordance with various embodiments, narrow fabric needle looms may achieve high weaving production speed due to the short stroke and rapid movement of the device introducing the weft yarn in each shed, and due to the ability of one machine to prepare multiple narrow tapes (e.g., two or more tapes simultaneously). Further, gain in production speed may be achieved by introducing a double yarn in each shed opening.

Moreover, in various embodiments, the weft fiber is also introduced and secured in a manner configured to enable the design and weaving of various fiber architectures. For example, tying of the weft yarn along one edge of the fabric through a binder thread and continuous transport of the weft yarn provide a novel mechanism to weave a helical fabric with variable weft fiber lengths across the width of the fabric.

Narrow fabric needle looms according to various embodiments facilitate tailoring of the weft content across the radial direction of the helical fabric. Weft tailoring across the width of the fabric may be accomplished through the use of one weft needle equipped with one eyelet, and suitable positioning of a latch needle with respect to the position of the side of the fabric where shorter lengths of radial yarn need to be introduced. In various embodiments, a weft needle with an eyelet operating from one side of the fabric or two weft needles operating from both sides of the fabric may be implemented to yield alternate weave constructions.

Weaving approaches using narrow fabric needle looms according to various embodiments may provide two selvedge edges (one woven and one knitted edge), a feature configured to facilitate transport of the fabric during preform fabrication. The helical fabric may be handled for transport from the weaving station to a circular needle loom station and for feeding within the circular needle loom during preform preparation. During weaving, warp yarns may be selected with a traditional shedding motion like heald frame control or through individual warp yarn jacquard control.

According to various embodiments, narrow fabric needle looms may facilitate manufacturing a continuous helical fabric tape with a tailorable weft to warp fiber content to meet, for example, the thermo-mechanical needs of a carbon-carbon aircraft brake disk. Such equipment may facilitate fabricating narrow fabrics at very high speed due in part to a weft transport system with a short stroke that is adapted for narrow goods, the insertion of two weft yarns for each shed opening, and the ability to equip one loom with multiple weaving stations. Various embodiments may be equipped with cylindrical conical take-off systems.

Various embodiments include a textile loom configured to generate a spiral textile tape having weft fibers of varying lengths as noted above. In various embodiments, a narrow tape needle loom may advantageously be configured to produce such a spiral textile. For example, a narrow tape needle loom may be configured to achieve high manufacturing speed of a textile having weft fibers of varying lengths. The loom may be equipped with one or more weft insertion needles configured to vary the length of weft fibers from the OD to the ID of the spiral textile. Movements of the weft needles in and out of the sheds formed by the warp fibers are linked to the movements of a reed and of a shedding mechanism. The needle loom may facilitate fabricating a spiral fabric with tailorable weft content across the fabric width using a binder thread to hold one end of the weft yarn. Weft fibers lengths selections from a reference fabric first edge may be achieved by suitable definition of the successive sheds and by moveable fingers. The movements of these fingers coming into temporarily positions between the reed and the fell of the fabric are mechanically or electronically synchronized with the movements of the various components of the loom. The loom may further be equipped with specially configured conical take-up rolls configured to change warp lengths across the textile tape width and/or to facilitate manufacturing of the spiral textile. Such configurations may be advantageously configured to improve textile output and/or manufacturing speed.

In one embodiment, subsequent to the narrow tape needle loom, the spiral-shaped textile may be fed into a circular needle loom to form a near shape needle-punched preform for various applications, such as carbon brake applications. Prior to needling, further transformation of the carbon textile may be implemented to achieve specific characteristics to enhance the needling process.

In accordance with various embodiments, it is desirable to maintain a substantially homogeneous fiber volume and/or content across a textile, which in turn results in a substantially uniform fiber density, radial fiber content, and/or fiber spacing, where the textile may be utilized as a friction surface, for example, in a brake disk. Substantially homogeneous/uniform fiber volume and/or density in a friction surface is desirable, for example, for the reasons set forth above. That being said, it should be noted that the present disclosure is not limited to textiles configured for use with brake disks; rather, any application that may utilize textiles having a homogeneous fiber volume are contemplated within the scope of the present disclosure.

In accordance with various embodiments, spiral textiles may be fabricated that have higher radial fiber content along the outer perimeter of the spiral textile than at the inside perimeter. Such a configuration may provide increased heat removal in the final composite where the heat removal is desirable, for example, resulting in a higher thermal conductivity along the OD where a large amount of work and/or heat is generated. Further, various embodiments of a spiral textile with higher radial fiber content near the OD also include a reasonably constant thickness across the width of the textile.

According to various embodiments, any type of fiber configured to be woven into a textile may be used. Such textile fibers may include, but are not limited to, oxidized polyacrylonitrile (PAN) fibers (which may hereinafter be referred to as "OPF"), carbonized PAN fibers, stabilized pitch fibers, ceramic precursor fibers, substantially pure carbon fibers or other suitable materials may be used. Generally, carbon fibers having above about 90 wt % carbon composition may be considered to be pure or substantially pure carbon fibers. Carbon fibers having a composition of carbon below about 90 wt % may be pre-carbonized or fully carbonized carbon fibers. Both types of carbon fibers may be used according to various embodiments.

Spiral textiles, in accordance with various embodiments, may be prepared with various weave patterns such as plain weave, twill, satin weave, and the like. For example, in the case of a brake application where the preform is prepared by needle-punching fabric layers of the spiral textile, weave patterns with long yarn floats provide fabrics with straighter fibers, thus yielding a densified preform with better thermal conductivity and mechanical strength than, for example, a densified preform prepared with a 1/1 plain weave. In various embodiments, the woven fiber orientation may be maintained during the handling operations following weaving through a reasonably secure interlacing of the weft and warp tows. A twill pattern, for example, may facilitate desirable handleability, whereas a looser satin pattern may not.

In accordance with various embodiments, and with reference to FIGS. 4-9, narrow fabric looms (which may include known or subsequently developed looms) are configured to include one or more weft needles 20 to tailor the fiber concentration across a width of a textile tape 5 and to meet predetermined specifications for a textile application, such as a friction brake disk application. The feeding of the weft fibers 30 is done by a rapidly moving weft needle 20 which inserts weft fibers 30 in a given warp fibers shed 40. Two or more ends of weft fibers 30 may be inserted in each shed opening. Various embodiments are configured to introduce variable lengths of weft fibers 30 across the tape width to achieve a weft fiber density, concentration and/or content in the spiral tape that is substantially uniform and/or homogeneous across its width, with a greater content of weft than warp fibers or yarns to enhance the thermal conductivity of the finished textile in the radial direction. In accordance with various embodiments, a textile tape 5 having a width of between 3 to 5 inches is generally amenable to use in a narrow tape needle loom.

Several machine configurations in accordance with various embodiments are configured to produce helical carbon fabrics with tailorable weft construction across the width of the fabric. In various embodiments, one weft needle with one eyelet is utilized. Further, in various embodiments, two weft needles operating alternatively from both sides of the fabric are used in conjunction with movable fingers acting between the reed and the fell of the fabric to establish positions of intermediate length weft yarns.

With reference to FIGS. 4-8 in accordance with various embodiments, weft needle 20 pulls out weft yarn 30 from a stationary bobbin and/or spool and carries the yarn through the shed to the furthest side of the fabric edge. Upon arrival of the end of weft needle 20 to its fixed travel position, the primary loop formed by yarn 30 is secured in place by a binder thread 8 controlled by a binder thread inserter 9 and a latch needle 7. Weft yarn 30 is held in place by binder thread 8 while weft needle 20 travels back through the shed to its starting position, thus leaving two weft yarns 30 in the shed. The reed beats-up the two segment of the weft yarn against the fell of the fabric and the previous steps are repeated. This results in pairs of weft fibers of identical or of different lengths within a shed depending on the definition of the various sheds. Such weaving mechanisms are configured to provide a desired fiber architecture having advantages for targeted product applications, for example, aircraft braking systems.

Various embodiments include configurations for variation in the placement, the number, and the features of the weft needles 20. In accordance with various embodiments, and with reference to FIG. 8 the two weft needles 20 may be mounted on either side of the textile tape 5. One needle may be configured to insert weft fiber along the full width of the tape, and the second needle with a smaller stroke may be configured to insert weft fiber at a selected reduced distance or distances from an edge of the textile tape.

With reference to FIGS. 8A1 and 8A2, the insertion of a weft yarn loop from the OD or first edge is illustrated. As the weft needle reaches the end of its travel one of several movable fingers placed at selected location across the width of the fabric is activated in the downward position. Upon return of the weft needle a loop is formed around the finger which sets the length of the weft yarn loop. The finger is moved in low position towards the beat-up point and then moved up prior to the reed beat-up. Following the reed beat-up an unbound weft yarn loop is left in the fabric.

Figure 8B:
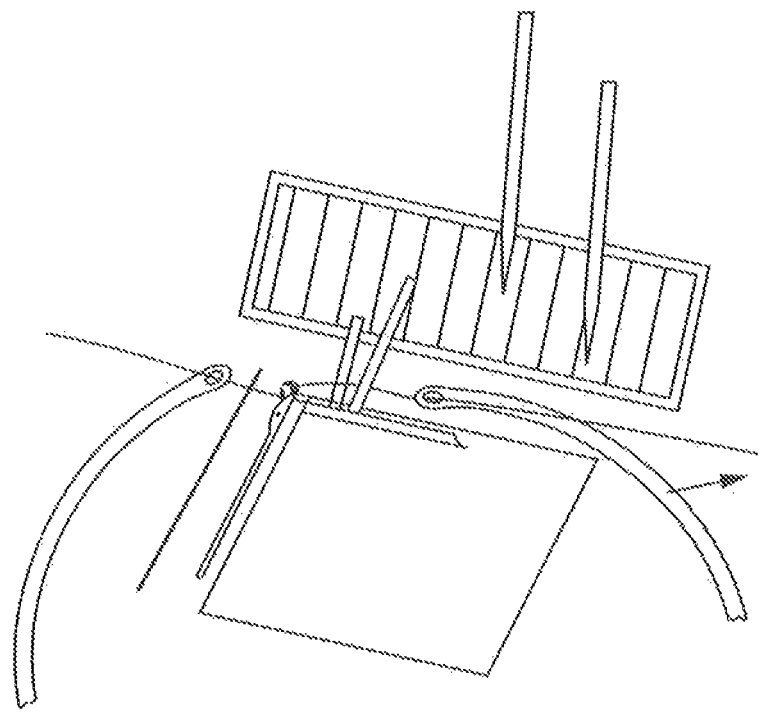

The next weft insertion takes place from the ID edge as shown in FIG. 8B. A full width insertion takes place and the weft loop is held in place by the knitting mechanism located on the left side of the fabric. This configuration results in equal weft fibers pairs within a shed. Such a configuration beneficially provides for a spiral-shaped textile having substantially uniform fiber density and/or content across its width.

According to various embodiments, and with reference again to FIG. 4, narrow fabric needle looms may be configured to introduce a knitted edge 50 on one side of textile tape 5 and a woven selvedge edge 60 on the other edge. For example, the selvedge edge 50 may be introduced on a side of the textile opposite to where the needle insertion occurs using a knitting system, and a second selvedge edge 60 may be formed where the weft yarn is looped around the last warp yarn. Selvedge edge 50 may be constructed by use of a binder thread 8 manipulated by a binder thread inserter 9, a latch needle 7 and their corresponding drives. Such edges are advantageously configured to provide a textile that may be handled to fabricate a final needled textile having a desired net shape.

Further fiber in proximity to the selvedge edges 50, 60 may be configured to advantageously minimize fiber waste in a final needled product. For example, the warps located in proximity to the selvedge edges may be configured to be comprised at least partially of a material other than carbon to minimize carbon fiber waste in a finished product, thereby reducing the cost to manufacture the product. Further, the selvedge edges may be removed by cutting and/or burning the edges prior to or during the manufacturing of the finished product.

According to various embodiments, a loom configured to insert weft tows having varying lengths may comprise one or more movable fingers configured to capture the weft loops at intermediate lengths (i.e., shorter than the entire width of the spiral textile). These movable fingers may be used to set the length of the weft yarns loops as illustrated in FIG. 8 and leave un-bound weft loops.

Figure 5:
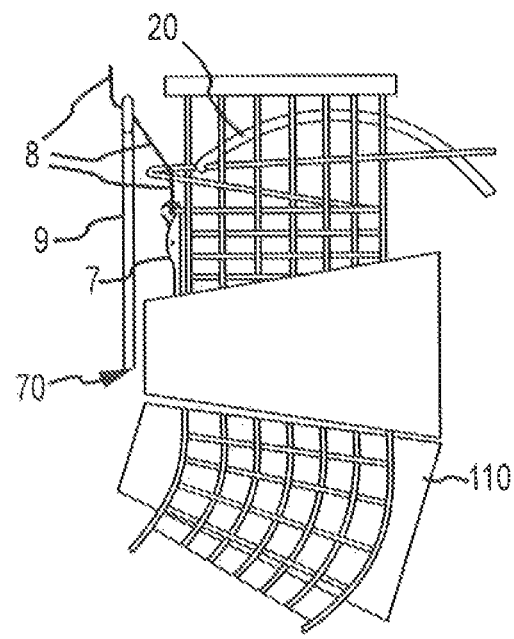
FIG. 5 illustrates a weft insertion needle, a knitting system placed on the side of a small diameter of a set of conical take-off rollers according to various embodiments.

Various embodiments are configured to facilitate suitable positioning of the binder thread latch needle 7 and of the orientation of the conical take-off system 70 (described in detail below). In existing narrow fabric needle loom applications, where the product is a straight woven fabric, the weft needle carries the weft yarn across the entire width of the fabric and the location of the binder thread latch needle 7 is not critical to the weft construction. In embodiments as disclosed herein that allow for preparation of a curved fabric with weft fiber construction of varying weft lengths, the positions of the latch needle 7 and of the conical take-off system 70 may be advantageously located on the loom. FIG. 5 illustrates various embodiments where the small diameter of the take-off cone 110 is on the same side as the latch needle 7. This arrangement is configured to yield a helical fabric with the weft fiber architecture illustrated in FIG. 1. This fiber architecture exhibits a deficiency of weft fiber concentration along the outer perimeter of the fabric.

Figure 6:
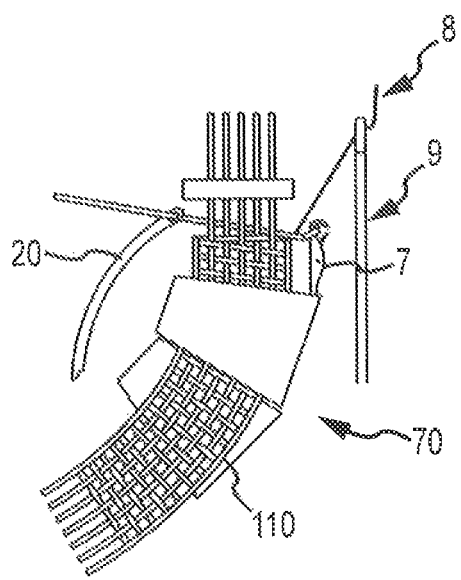
FIG. 6 illustrates a weft insertion needle, a knitting system placed on a side of a large diameter of the take-off rollers according to various embodiments.

In various embodiments, the large diameter of the take-off conical rollers 110 is located on the same side as the latch needle, for example, to provide flexibility in varying the length of the weft during each shed opening. FIG. 6 illustrates the respective positions of the weft needle 20, latch needle 7 and conical take-off rollers 110 for a narrow tape needle loom according to various embodiments.

Figure 9:
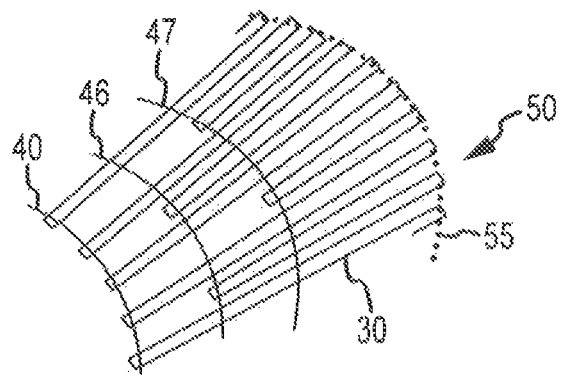
FIG. 9 illustrates a portion of a spiral textile with knitted edge and three weft fibers lengths according to various embodiments.

Embodiments as illustrated in FIG. 6 are capable of yielding helical fabric with tailorable radial fiber contents across the width of the fabric as shown in FIG. 9. During each shed opening, the binder thread 8, the binder thread inserter 9 and the latch needle 7 establish a substantially fixed reference point for the weft yarn. In various embodiments, the knitted edge 55 formed by the binder thread 8 and the fixed turn around points for the weft yarn 30 are located on the side corresponding to the outer perimeter of the helical fabric. This location enables the control of the radial length for each weft insertion from the large radius to the small radius of the helical fabric.

The length of each radial weft double segment is selected by choosing, through the appropriate shed sequence, a given warp yarn for the weft to loop around. FIG. 9 shows the two warp yarns 46, 47 selected for securing the weft yarns at two pre-selected lengths from the outer perimeter of the helical fabric according to various embodiments. FIG. 9 also illustrates the continuity of the weft yarn during progression of the weaving operation. Weave variations containing multiple points of weft yarn returns within a repeat may be implemented according to various embodiments to further refine the concentration of weft yarn across the helical fabric.

Figure 10A:
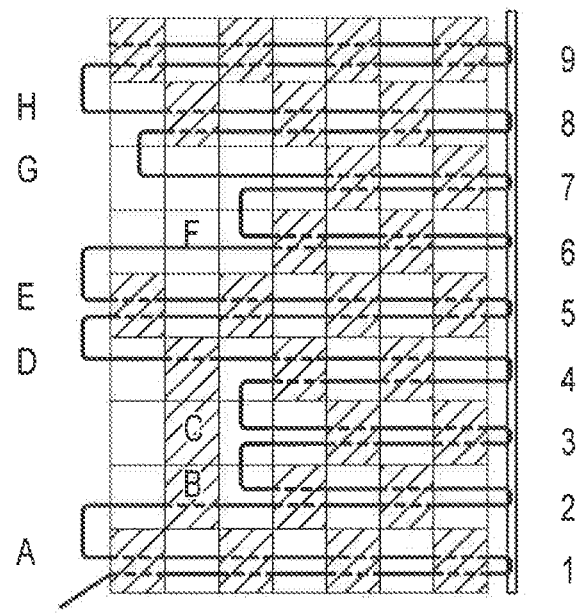
FIGS. 10A and 10B illustrate details of weft yarn path with one needle within fabric for a plain weave fabric according to various embodiments.
Figure 10B:
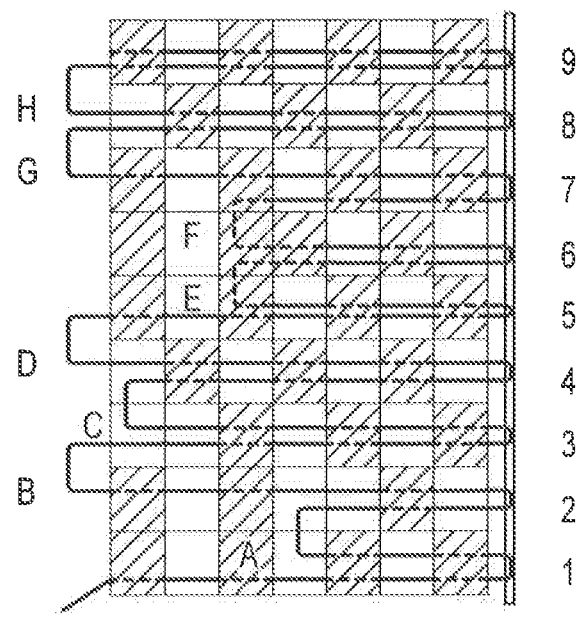

The fabric prepared with embodiment FIG. 6 exhibits unique features as illustrated in FIGS. 10A and 10B which highlight the weft yarn within various sheds, the path of the continuous weft yarn for the first nine picks and the locations of the various loops formed by the weft yarn in the case of two possible plain weave architectures with 7 warp yarns. The weft yarn formed primary loops held by a knitted binder thread along the first edge; the knots of the binder thread are numbered 1 to 9 and so on. The weft yarn formed woven weft yarn secondary loops A to H along the second edge and at intermediate widths across the fabric. The rows of squares represent shed openings. The columns of squares show the warp yarns. White squares are areas of the fabric where the warp yarn is below the weft yarns. Grey squares are areas of the fabric where the warp yarn is above the weft yarns.

The first pick of the fabric shown in FIG. 10A (very bottom row of squares) is comprised of two segments of the same weft yarn forming a primary weft yarn loop with a common reference knitted knot 1. The upper weft yarn segment extending from reference 1 constitutes half of the first weft fibers and half of its secondary weft yarn loop. The two weft segments have equal lengths and lay down across the entire width of the fabric.

The second pick shows two segments of the same weft yarn forming along the first edge a primary weft yarn loop with a common reference knitted knot 2. The lower segment extending from reference 2 constitutes the remaining half of the first weft fibers and half its primary loop. The top segment extending from reference 2 constitutes half of the second weft fibers and half its primary loop. The two segments in the second pick have different lengths, one segment lays down across the full width of the fabric, the second segment lays down at an intermediate length from the referenced knitted edge. In subsequent picks the two weft segments may be of the same length or of different length depending on the radial fiber construction which is pursued.

The weft fibers 1-A-2, 2-B-3 with respective references 1 and 2 and 2 and 3 and so on are each built during the course of two picks or two weft needle insertions.

Furthermore the locations of the secondary weft yarn loops situated at intermediate lengths from the reference knitted edge vary with selected fiber architectures. For example in FIG. 10-A the three secondary weft yarn loops B, C and F formed at intermediate lengths from the first edge are placed above the warp yarns. In FIG. 10B the secondary weft yarn loops A and C formed at intermediate lengths are placed above the warp yarns, others like E and F are placed below the warp yarns.

FIGS. 10A and 10B show sheds through the various rows of grey and white squares further describe the unique method used to describe the weft/radial fiber architecture. Full fabric width weft fibers lengths like 4D5 and 8H9 are achieved by alternating the shed position of the first warp yarn along the second edge from one weft needle insertion to the next. Partial length weft fibers like 2B3 and 6F7 are achieved by maintaining the shed position of the first three warp yarns along the second edge from one welt needle insertion to the next. Yarn 4, the first warp yarn from the second edge occupying an alternate shed position from one weft needle insertion to the next is the warp yarn used to keep the weft fibers at an intermediate length from the first edge.

Figure 11:
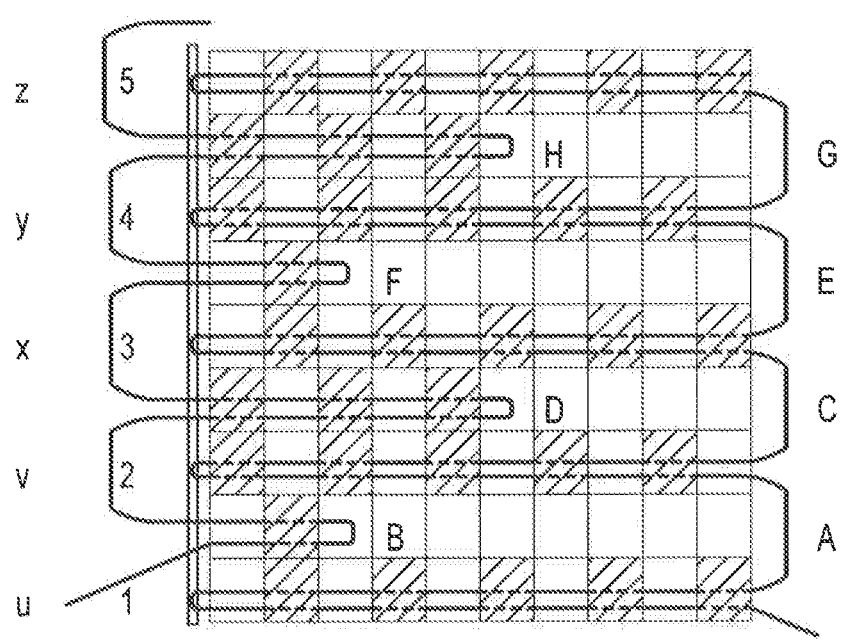
FIG. 11 illustrates details of weft yarns paths within fabric for a plain weave fabric with two opposite needles and movable fingers according to various embodiments.

The fabric prepared with embodiment shown in FIG. 8 exhibits unique features as illustrated in FIG. 11 which highlight the weft yarn within various sheds, the path of the continuous weft yarn for the first nine picks and the locations of the various loops formed by the weft yarn in the case of a possible plain weave architecture with 10 warp yarns. The first pick of the fabric shown in bottom row of FIG. 11 is comprised of two segments of the same weft yarn 1 forming a primary weft yarn loop with a common reference knitted knot 1. The upper weft yarn segment extending from reference 1 constitutes half of the first weft fibers and part of its secondary weft yarn loop. The two weft segments have equal lengths and lay down across the entire width of the fabric. The second pick shows two segments of a different weft yarn 2 extending from the first edge. The two weft segments have equal lengths and lay down up to a set length from the first edge. The upper and lower weft yarn segments constitute the second weft fibers and its primary loop B. The third pick is comprised of two segments of weft yarn 1 forming a primary weft yarn loop with a common reference knitted knot 2. The lower weft yarn segment extending from reference 2 constitutes half of the first weft fibers and part of its secondary weft yarn loop. The upper weft yarn segment extending from reference 2 constitutes half of the third weft fibers and part of its secondary weft yarn loop. The two weft segments have equal lengths and lay down across the entire width of the fabric.

The fourth pick shows two segments of weft yarn 2 extending from the first edge. The two weft segments have equal lengths and lay down up to a set length from the first edge. The upper and lower weft yarn segments constitute the fourth weft fibers and its primary loop D.

The first edge is formed of weft yarn loops secured with a binder thread and woven weft yarn loops. The second edge is formed of woven loops. The intermediate length weft yarn loops B, D, F and H are un-bound.

FIG. 11 showing the definition of each sheds through the various rows of grey and white squares further describe the unique method used to define the weft/radial fiber architecture for this embodiment.

Full fabric width weft fibers length like 1A2 and 2C3 are achieved by alternating the shed position of the first warp yarn along the second edge from the first weft needle insertion and keeping the new shed for that yarn for the next two weft needle insertions.

Partial length weft fibers like uBv and vDx are achieved by alternating the shed position of the first warp yarn along the first edge from the insertion of the second weft fibers uBv to the insertion of the fourth weft fibers vDx.

As noted above, spiral textile tapes with weft fibers that extend across the entire width of the textile tape generally exhibit a deficiency in weft fibers (i.e., a reduced weft fiber density or radial fiber content) that grows with location from the inside diameter of the spiral tape to the outside diameter of the spiral tape (i.e., the weft fiber density and/or content is generally greater at the ID than the OD). For example, in a construction with 2.7 tows per inch using 50K tow in the warp direction and 6 tows per inch using 24K tow in the weft direction the following Tables 1 and 2 illustrate gaps, deficiencies and/or reduced density in radial weft fibers (i.e., reduced concentration/density of weft fibers due to an increased circumference at the OD compared to the ID) as a function of the distance from the OD to the ID for two spiral tapes having different diameters. Smaller disks generally exhibit a greater fiber deficiency along the OD.

TABLE 1

Weft fiber deficiency across spiral tape width (20 in. OD, 10 in. ID disk)

| Distance from edge corresponding to OD (inches) | # tow ends/in. deficiency in weft (Multiple of 48K) | # filaments/in deficiency in weft (Multiple of 2K) |
|---|---|---|
| 0 | 3.0 | 72 |
| 0.5 | 2.8 | 68 |
| 1 | 2.7 | 64 |
| 1.5 | 2.5 | 59 |
| 2 | 2.3 | 54 |
| 2.5 | 2.0 | 48 |
| 3 | 1.7 | 41 |
| 3.5 | 1.4 | 33 |
| 4 | 1.0 | 24 |
| 4.5 | 0.5 | 13 |
| 5 | 0 | 0 |

In accordance with various embodiments, the weft tow deficiency closer to the OD can be addressed using additional insertion of weft tows at different lengths across the width of the tape. This insertion may be done using one of several possible approaches, for example, insertion of a given size tow at different lengths for each shed insertion (and repeating a predetermined pattern), or simultaneous insertion of different size tows at different lengths in a given shed insertion.

TABLE 2

Weft fiber deficiency across spiral tape width (13 inch OD, 5 in. ID disk)

| Distance from edge corresponding to OD (inches) | # tow ends/in. deficiency in weft (Multiple of 48K) | # filaments/in deficiency in weft (Multiple of 2K) |
|---|---|---|
| 0 | 3.7 | 89 |
| 0.5 | 3.5 | 84 |
| 1 | 3.3 | 79 |
| 1.5 | 3 | 72 |
| 7 | 2.7 | 64 |
| 2.5 | 2.2 | 54 |
| 3 | 1.7 | 41 |
| 3.5 | 1 | 24 |
| 4 | 0 | 0 |

Figure 12:
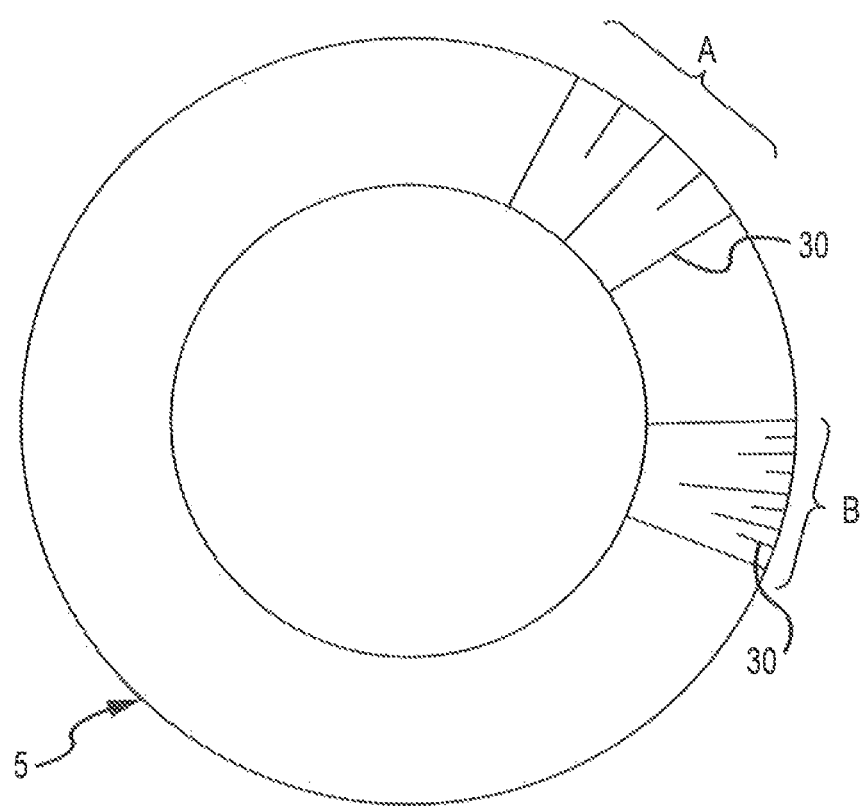
FIG. 12 illustrates a spiral textile with sections of two and four weft fiber length configurations according to various embodiments.
Figure 13:
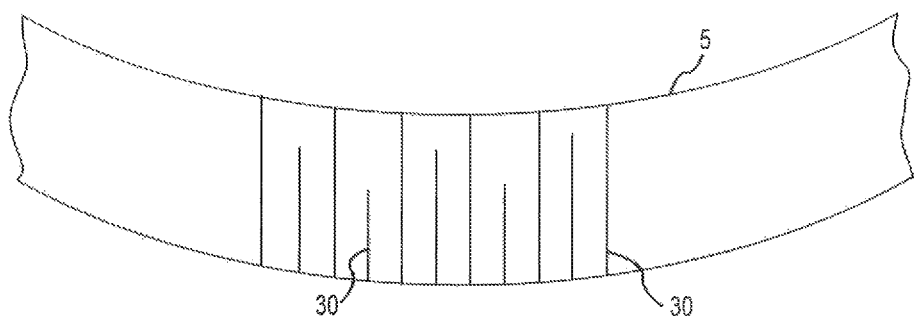
FIG. 13 illustrates a portion of a spiral textile with three different lengths of weft fibers according to various embodiments.
Figure 14:
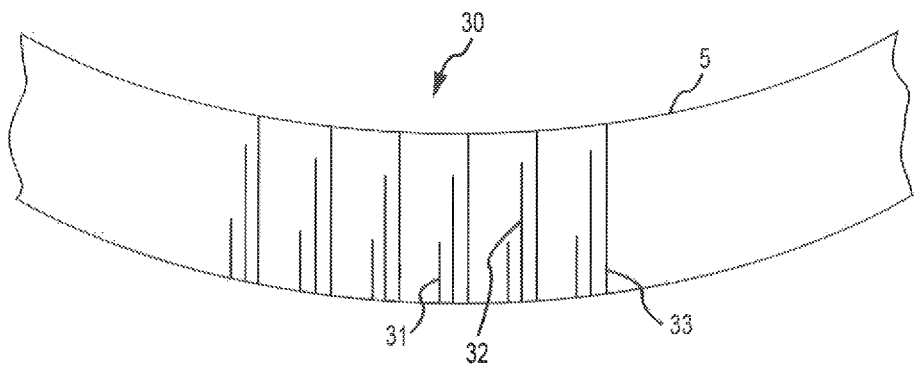
FIG. 14 illustrates a portion of a spiral textile with a pattern of weft fiber lengths according to various embodiments.

In accordance with various embodiments, and with reference to FIGS. 12-14, various size weft tows 30 may be inserted at different lengths for each shed insertion. Such a configuration facilitates increased flexibility in weft fiber construction. Each needle insertion is advantageously configured to insert one double end of a tow in each shed opening at a length of the weft that may be controlled with a repeated pattern along the length of the textile tape. A needle loom as discussed above may comprise one or more needles to facilitate manufacturing a spiral textile having such a weft configuration.

Table 3 illustrates radial to circumferential fiber content ratios for various embodiments where 2.7 ends per inch of 50K tows are utilized in the warp direction and 24K tows are utilized in the weft direction, with two intermediate weft length variations as illustrated in FIG. 13. It should be understood that a more complex weft length pattern may be utilized to yield additional increases in the uniformity of radial fiber content across the spiral textile radius.

TABLE 3

Radial to circumferential fiber content ratios at various distances from OD (2.7 50K warp tows per inch)

| Distance from OD edge (inches) | Ratio rad. to circ. fiber content for 5 inch wide tape (ID: 10"; OD: 20") | Ratio rad. to circ. fiber content for 4 inch wide tape (ID: 5"; OD: 13") |
|---|---|---|
| 0 | 1.8 | 1.4 |
| 1 | 2 | 1.6 |
| 2 | 1.8 | 1.6 |
| 3 | 1.4 | 1.4 |
| 4 | 1.6 | 2 |
| 5 | 2 | n/a |

Table 4 illustrates a similar scenario for a five inch wide tape, but where 3 ends per inch of 50K tows are utilized in the warp direction. Table 5 illustrates a scenario for a five inch wide tape where 3 ends per inch of 50K tows are utilized in the warp direction, but where there is only one size of intermediate length weft fibers disposed between the weft fibers that extend fully across the width of the textile

TABLE 4

Radial to circumferential fiber content ratios at various distances from OD (3 50K warp tows per inch)

| Distance from OD edge (inches) | Ratio rad. to circ. fiber content for 5 inch wide tape (ID: 10"; OD: 20") |
|---|---|
| 0 | 1.6 |
| 1 | 1.8 |
| 2 | 1.7 |
| 3 | 1.3 |
| 4 | 1.5 |
| 5 | 1.8 |

TABLE 5

Radial to circumferential fiber content ratios at various distances from OD for a single intermediate length weft insertion (3 50K warp tows per inch)

| Distance from OD edge (inches) | Ratio rad. to circ. fiber content for 5 inch wide tape (ID: 10"; OD: 20") |
|---|---|
| 0 | 1.6 |
| 1 | 1.8 |
| 2 | 1.1 |
| 3 | 1.3 |
| 4 | 1.5 |
| 5 | 1.8 |

In various embodiments, a predetermined number of weft yarn length variations within a repeat, as shown in FIG. 9, yield a fabric with a reasonably homogeneous weft fiber concentration across the width of the helical fabric. Table 6 shows an example of weft fiber concentration across the fabric width at various distances from the outside diameter for two weft length variations within the width of the fabric. The fabric is fabricated with one weft needle with one eyelet operating from the side of the smaller diameter of the take-off rollers and with the latch needle positioned on the side of the large diameter of the take-off system. Calculations were conducted for a helical fabric with outside diameter of 20 inches and an inside diameter of 10 inches. The carbon weft tow is 24000 filaments and the number of pick insertions per inch along the OD is 6.

TABLE 6

Example of weft fiber concentration across a helical fabric with 10 inch outside radius, 5 inch inside radius for 24K carbon tow and weft construction per FIG. 9

| Distance from edge corresponding to OD (inches) | # tow ends/in. at the given distance from edge | # filaments/in (×10000) at the given distance from edge |
|---|---|---|
| 0 |  | 29 |
| 0.5 | 13 | 30 |
| 1 | 13 | 32 |
| 1.5 | 14 | 34 |
| 2 | 13 | 30 |
| 2.5 | 13 | 32 |
| 3 | 9 | 21 |
| 3.5 | 9 | 22 |
| 4 | 10 | 24 |
| 4.5 | 11 | 26 |
| 5 | 12 | 29 |

As noted previously, many different lengths of weft tows may be utilized in accordance with various embodiments. For example, FIGS. 12-14 illustrate various configurations of weft fibers 30 having different lengths across the width of textile 5. It should be understood that any combination of lengths of weft fibers 30 may be utilized to achieve a desired fiber content, for example, a substantially uniform, increasing, or decreasing fiber density and/or content across the width of a spiral textile.

In various embodiments, and with reference to FIGS. 6, 7, 9 and 15, further tuning of the characteristics of the weft fiber construction may be accomplished by implementing a repeat with a larger number of weft length variations. A narrower spread of fiber concentrations across the width of the fabric may, for example, be accomplished with a larger number of weft length variations within a repeat. The flexibility to have long repeats provides the means to achieve a substantially homogeneous radial fiber content or a tailorable progressive increase of radials from the ID to the OD.

Figure 15:
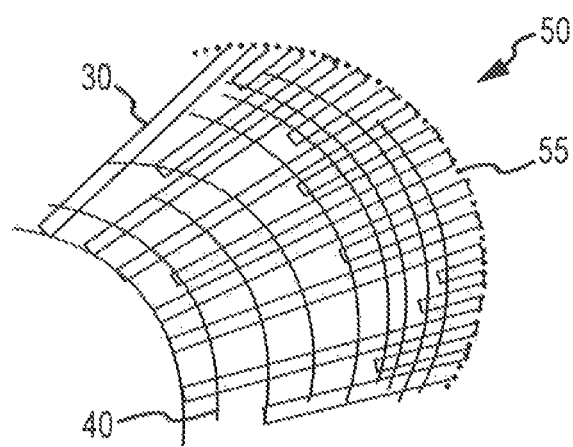
FIG. 15 illustrates a portion of a spiral textile with reference knitted edge and weft fibers of varying lengths according to various embodiments.

In various embodiments, a fabric architecture exhibiting a gradual increase of the weft concentrations from the ID to the OD of the fabric may be built with up to 8, 10 or more additional weft length variations within a repeat. For example, various embodiments with 10 weft length variations is illustrated in FIG. 15. Such a fiber architecture design may, for example, be built with approximately one-third more weft fiber along the OD than along the ID region. In a braking application, such increased concentration along the OD facilitates heat extraction from the regions where more work is driven into the brake disk during braking. This increased concentration results in a higher thermal conductivity along the OD where the highest amount of work is generated, and increases the heat removal where it may be most needed. In various embodiments, the thickness of the textile remains substantially constant while the weft fiber concentration increases towards the OD.

Table 7 summarizes an example of decreasing weft fiber concentration at incremental radial distances from the OD. The fabric has outside and inside radii of respectively 10 and 5 inch. The carbon weft tow is 24000 filaments and the number of pick insertions per inch along the outer perimeter is 6. Other weft fiber ratios between the OD and ID regions may be achieved. In a similar way various graduations of the weft fiber content from outside to inside radius may be designed.

TABLE 7

Example of weft fiber concentration across a helical fabric with 10 inch outside radius, 5 inch inside radius for 24K carbon tow and weft construction per FIG. 15

| Distance from OD (inch) | # weft tows per inch at given distance | # weft filaments per inch (×10000) at given distance |
|---|---|---|
| 0 | 12.0 | 28.8 |
| 0.2 | 12.2 | 29.4 |
| 0.5 | 11.8 | 28.4 |
| 1 | 11.7 | 28.0 |
| 1.5 | 11.5 | 27.5 |
| 2 | 11.3 | 27.0 |
| 2.5 | 11.0 | 26.4 |
| 3 | 10.7 | 25.7 |
| 3.5 | 10.4 | 24.9 |
| 4 | 10.0 | 24.0 |
| 4.5 | 9.5 | 22.9 |
| 5 | 9.0 | 21.6 |

In various embodiments, the warp fiber content may be defined to meet certain criteria, for example, a) to create a substantially balanced fiber content in warp and weft direction along the ID; b) to create a higher weft to warp content in various regions of the textile; c) to maximize weft content in OD region by minimizing warp content in that region; d) to maintain the thickness of the fabric to be reasonably constant across the width of the fabric.

In various embodiments, the radial fiber content may be raised by keeping the circumferential fiber content low. For example, the warp fiber content along the OD region may be selected to be approximately 2.7 ends per inch which provides substantially full warp coverage using a low warp count, as discussed below In accordance with various embodiments, the thickness of a fabric may be substantially constant across the width of the fabric, where the weft content increases from ID to OD, by utilizing a higher concentration of warp yarns along the ID than along the OD. This higher concentration may be accomplished by either using the same yarn denier across the width and changing the yarn count across the width or by using different yarn deniers across the width of the fabric.

In various embodiments, the above criteria are utilized to define the warp content and the weft yarn design, for example, as shown in FIG. 15 and Table 8, and from this content and design, the fabric architecture shown in Table 10 may be derived. The embodiment shown in Table 10 uses a 50K tow in the warp direction and a double 24 K tow insertion in the weft direction. Six insertions per inch are used in the weft direction, and 2.7 ends per inch (an amount advantageously determined to provide full coverage) are used in the warp direction closer to the OD of the fabric. Four ends per inch are used along the ID to balance the weft and warp content in that region. The warp count is increased from the OD to the ID to maintain constant thickness. The resulting fabric has a weft to warp ratio greater than 1.6 in the outer half section of the disk and a progressively increasing radial content from ID to OD.

TABLE 8

Example of helical fabric construction with high weft to warp ratio along OD and showing a gradual increase of the radial content from the ID to the OD region.

| Distance from OD (inch) | # 24K weft tows per inch at given distance | # warp ends/inch to achieve coverage with 50K tow | Radial fiber weight at given distance (g/m2) | Circumf. fiber weight at given distance (g/m2) | Ratio weft to warp at given distance |
|---|---|---|---|---|---|
| 0 | 12.0 | 2.7 | 732 | 372 | 2.0 |
| 0.2 | 12.2 | 2.7 | 747 | 372 | 2.0 |
| 0.5 | 11.8 | 2.8 | 723 | 382 | 1.9 |
| 1 | 11.7 | 2.8 | 712 | 392 | 1.8 |
| 1.5 | 11.5 | 2.9 | 700 | 404 | 1.7 |
| 2 | 11.3 | 3.0 | 687 | 418 | 1.6 |
| 2.5 | 11.0 | 3.1 | 671 | 433 | 1.6 |
| 3 | 10.7 | 3.3 | 654 | 451 | 1.5 |
| 3.5 | 10.4 | 3.4 | 634 | 471 | 1.3 |
| 4 | 10.0 | 3.6 | 610 | 494 | 1.2 |
| 4.5 | 9.5 | 3.8 | 582 | 522 | 1.1 |
| 5 | 9.0 | 4.0 | 549 | 555 | 1.0 |

In various embodiments, a targeted fabric weight for a carbon fiber textile is about 400 to about 1400 grams per square meter. In general, the carbon yarn size is selected to be as large as possible to keep fabrication cost to a minimum. For example, 50K and 24K fiber tows may be utilized according to various embodiments, with the 50K tow being in the warp direction for warp fibers 40, and the 24K tow being in the weft direction for weft fibers 30. In various embodiments, OPF yarn may be utilized.

One approach to increase heat extraction along the radial direction of the C/C disk is to build the above fabric designs with a larger amount of fibers in the weft direction than in the warp direction. In this embodiment, the minimum amount of warp fiber concentration providing full coverage in the circumferential direction is used as the starting point to design the fiber architecture. Using a 50K carbon tow in the warp direction a possible minimum tow count to insure coverage is 2.7 tows per inch.

The following Table 9 shows overall fiber content in both the warp and weft directions using a theoretical homogeneous distribution of the weft fibers (i.e., the weft fiber distribution is homogeneous across the fabric width with variable weft lengths). Maximizing the amount of radial (weft) fibers and minimizing the circumferential (warp) fibers may be set as a first guideline to advantageously arrive at suitable fiber constructions.

TABLE 9

Examples of fabric constructions with homogeneous weft content across the width of the fabric and with increasingly higher weft to warp ratio

| Circumferential ends/inch to achieve coverage with 50K tow | Weft picks/inch using double 24K weft tow insertion | Resulting circumf. fiber weight g/m² | Resulting radial fiber weight g/m² | Total fiber weight g/m² | % radial fiber to total fiber |
|---|---|---|---|---|---|
| 2.7 | 3 | 372 | 366 | 738 | 50 |
| 2.7 | 4 | 372 | 488 | 860 | 57 |
| 2.7 | 5 | 372 | 610 | 982 | 62 |
| 2.7 | 5.5 | 372 | 671 | 1043 | 64 |
| 2.7 | 6 | 372 | 732 | 1104 | 66 |
| 2.7 | 7 | 372 | 854 | 1226 | 70 |

One assumption for achieving the lowest possible circumferential reinforcement content according to various embodiments is to target the minimum number of warp tows per inch providing sufficient coverage in that direction. With a potential warp tow spread in the tape of about 0.37 inches, the corresponding warp counts for a 50K tow would be about 2.7 tows per inch or about 372 grams per square meter. Keeping the tows within the woven tape as flat as possible to increase layer to layer interaction during needle-punching may be a second guideline. The more ends per inch in the woven tape the more rounded the tow cross section becomes and the thicker the fabric becomes.

Based on various embodiments of a fabricated tape, an upper limit for the tow count in the weft direction for a double insertion of a 24K tow may be defined to be 7× (2×24K) or about 854 grams per square meter in the weft direction. With a fixed amount of circumferential fibers of 2.7 50K end per inch and varying the weft concentration from about 3 to 7 tows per inch (any fraction of a tow may be considered), Table 9 illustrates a range of fiber distributions in the two reinforcement directions, circumferential and radial.

Using the weft architecture shown in FIG. 9 woven with a 24K tow in the weft direction and a 50K tow in the warp direction and varying the weft pick count at the OD from 3 to 7 picks per inch; one can select the amount of weft (radial) from 50 to 70% of the total fiber content in accordance with various embodiments. Table 9 summarizes examples of fabric constructions with reasonably homogeneous fiber content in the weft direction across the width of the fabric and with higher ratios of weft to warp yarn contents. The 50K tow has a linear weight of 3.5 g/m; the double 24K tow insertion has a linear weight of 3.1 g/m. Other constructions and fabric weights are possible with other fiber tow sizes and higher densities of circumferential yarns.

In various embodiments, it may be advantageous to use a large tow for the warp direction to minimize fabrication cost. A 50 K carbon tow can be handled in the warp direction. A helical carbon fabric may be fabricated on the modified narrow fabric needle loom using 50 K carbon tow in the warp direction and 24K carbon tow in the weft direction. A weft repeat of 16 was designed to provide a homogeneous fiber concentration throughout the surface of the fabric. In various embodiments, the pick count along the outer perimeter of the fabric is 6.3 insertions per inch. The warp count is 4 tows per inch. The resulting fabric weight is 1400 grams per square meter (g/m2).

In various embodiments, an advantageous fabric weight for fabricating a carbon brake disk preform using needle-punching preforming is about 400 g/m² to about 1400 g/m². The carbon yarn size may be selected to be as large as possible to keep fabrication cost to a minimum. For example, 50K and 24K fiber tows may be utilized according to various embodiments, with the 50K tow being in the warp direction, and the 24K tow being in the weft direction. Other combinations such as 24 and 12K, 12K and 12K, 24K and 6K or 12K and 6K may be used.

As noted above, in accordance with various embodiments, different size and lengths of weft tows may be configured to further maintain consistency in the ratio of radial to circumferential fiber content between the ID and OD of a spiral textile. In various embodiments, two needles may be used, though in various embodiments only one needle is used.

TABLE 10

Radial to circumferential fiber content ratios at various distances from OD with one 24K weft tow and one or two 12K weft tows

| Distance from OD | Ratio rad. to circ. fiber content for 5 inch wide tape | | Ratio rad. to circ. fiber content for 4 inch wide tape | |
|---|---|---|---|---|
| (inches) | 1 × 12K | 2 × 12K | 1 × 12K | 2 × 12K |
| 0 | 1.5 | 2 | 1.1 | 1.5 |
| 1 | 1.6 | 1.6 | 1.3 | 1.8 |
| 2 | 1.8 | 1.8 | 1.6 | 1.6 |
| 3 | 1.4 | 1.4 | 1.4 | 1.4 |
| 4 | 1.6 | 1.6 | 2 | 2 |
| 5 | 2 | 5 | — | — |

Various embodiments increase the manufacturing speed of the spiral textile in order to facilitate economical manufacturing. Greater weaving speed and superior process efficiency of the narrow fabric needle loom over a traditional shuttle loom is realized in several manners as disclosed herein.

Contrary to a shuttle loom which inserts a single small tow in each shed opening, embodiments of the modified narrow fabric needle loom are capable of inserting two large carbon fiber tows for each pick. Weft insertion of a 24 K carbon tow according to various embodiments results in the introduction of two 24K tows for each shed opening, which is four times as fast as a shuttle loom introducing at a 12K tow for each shed opening.

Figure 16:
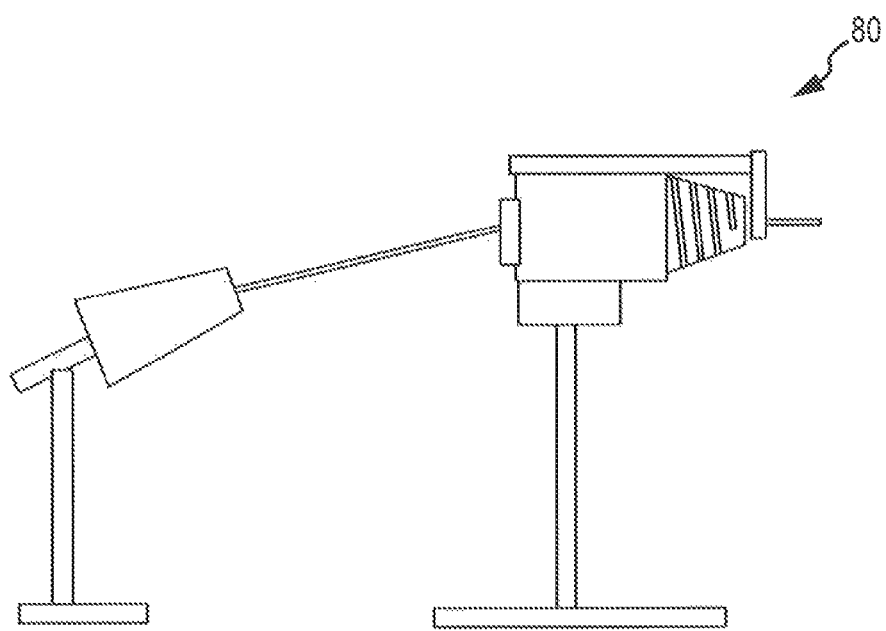
FIG. 16 illustrates a weft feeder according to various embodiments.

Furthermore, the weft yarn transport through a weft needle with a back and forth movement according to various embodiments has the ability, when combined with the proper weft feeder, to provide a continuous production process. For example, a feeder, tailored for the size and characteristic of the weft yarn, may be inserted between the weft spool and the narrow needle loom. FIG. 16 shows a weft feeder 80 according to various embodiments. Weft feeder 80 pulls a predetermined length of weft yarn from the spool and winds it on a conical drum, which constitutes a reserve for several weft insertions.

Figure 7:
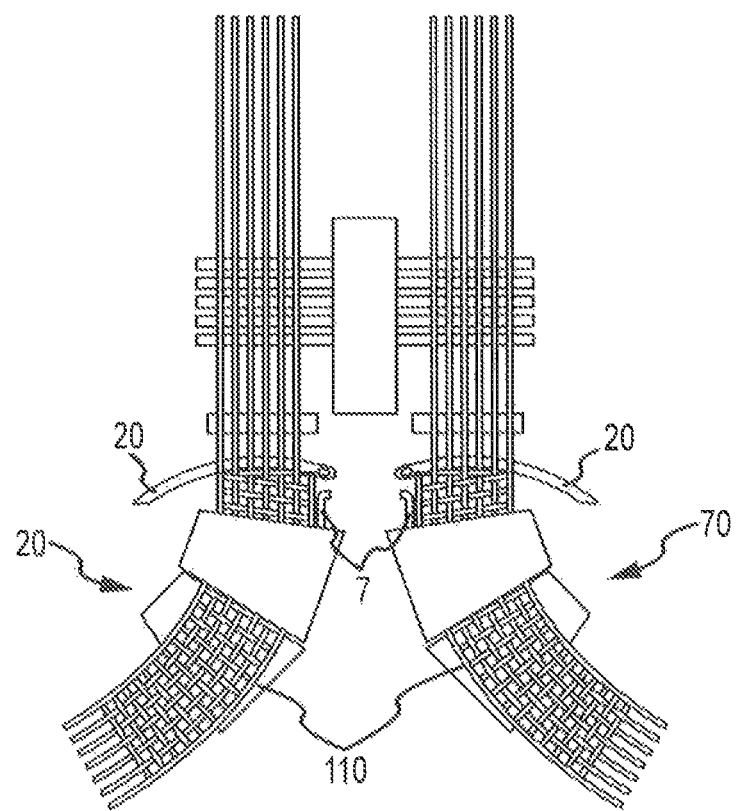
FIG. 7 illustrates two weaving stations for manufacturing two spiral textiles according to various embodiments.

In various embodiments, one or more weaving stations may be utilized on the narrow tape loom. For example, a loom with two weaving stations is illustrated in FIG. 7. Take-off rollers installed behind the reed provide the mechanism for forming the fabric curved geometry. In such various embodiments, carbon fiber samples may be prepared at a speed of 3.9 ft per min of fabric using 7 picks per inch along the outside radius. This speed translates in the production of approximately 8 it/min of carbon fabric on a double weaving head loom.

A needle loom according to various embodiments may be configured with a heald frame and/or reed and harness frame mechanism to manipulate the warp yarns and/or to control the shedding motion. Installation of electronically-controlled conventional or subsequently developed electronic jacquard heads may be utilized to create further versatility in weave architecture, for example with the targeted carbon spiral tape. Further, various embodiments provide that optimum manufacturing speed may be achieved by designing a loom with two or more stations for processing multiple spiral textiles at the same time.

Another benefit of the narrow fabric needle loom, according to various embodiments, is the formation of two selvedge edges 50, 60 which greatly facilitate further handling of the fabric in the subsequent forming step used to from a "donut shape" preform using needle punch technology. One edge is formed by looping one end of the weft around the warp tow closest to the point of introduction of the weft needle. The second selvedge is formed with the opposite end of the double weft tow and the binder thread.

Figure 3:
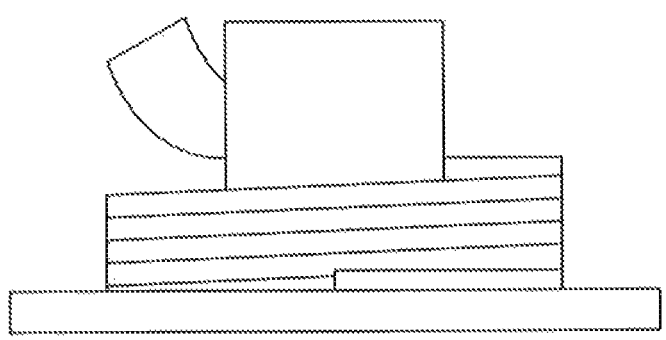
FIG. 3 illustrates a prior art mechanism for winding a winding and unwinding spiral textile.
Figure 4:
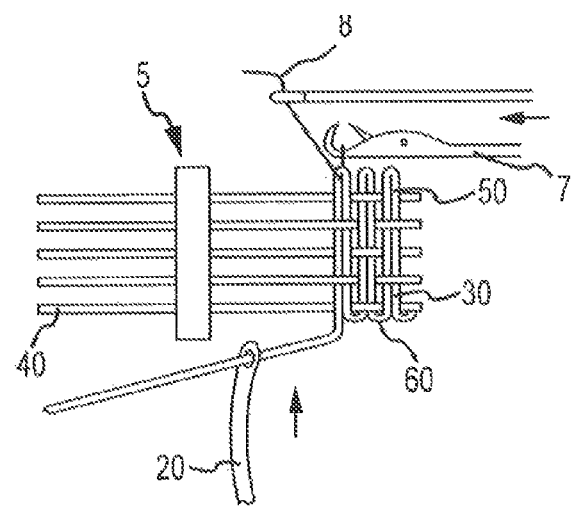
FIG. 4 illustrates movement of a weft insertion needle and of a knitting system according to various embodiments.
Figure 4:
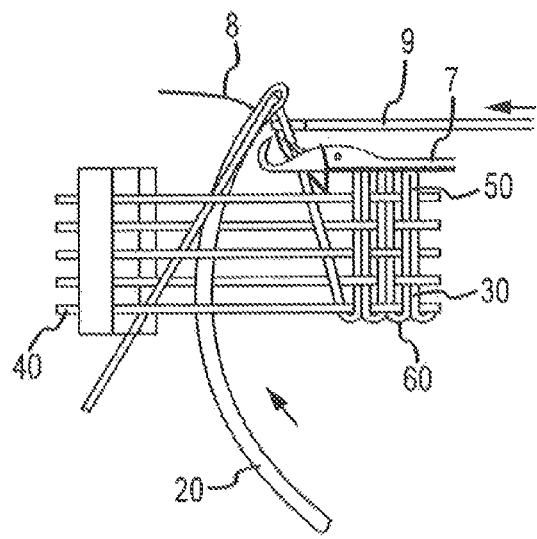
Figure 4:
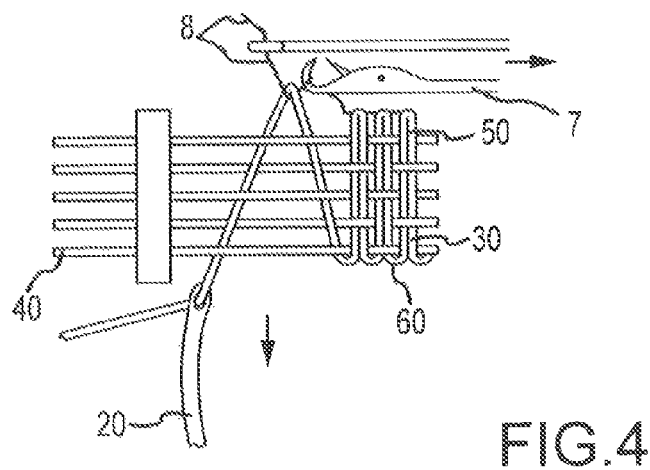

As noted above, existing reels, spools and other mechanisms for collecting, storing, and deploying spiral textiles, for example, as illustrated in prior art FIG. 3, require substantial space and complex routing schemes to deploy the spiral textile on a circular needle loom in order to create a needled preform. Further, prior art mechanisms often require substantial care in order to maintain the weave of the spiral textile. In order to address these and other deficiencies, and in accordance with various embodiments, a collection, storage and/or feeding device such as a spool, reel and the like may be utilized to advantageously receive a spiral textile tape from a loom in a manner that more easily and efficiently maintains the shape and weave of the spiral textile tape with less distortion than prior art mechanisms. As will be discussed below, the spiral textile tape may be fed directly from the collection/storage/feeding device onto a bedplate of a circular needle loom. The tape may be prepared with a relatively loose weave such that various embodiments substantially minimize any distortion of the tape that would shift the fibers in the tape around.

In accordance with various embodiments, a spiral textile tape is transported from the loom where the spiral textile tape is created to another location. For example, conical take off system 70 may comprise a spool 110 that facilitates taking the spiral textile off of the narrow tape needle loom. The spiral textile tape may then be transported, for example, on spool 110, to a circular needle loom where the spiral textile tape is removed from spool 110, and then layered on a bedplate of a circular needle loom and needled into a preform of a selected geometry.

Figure 17A:
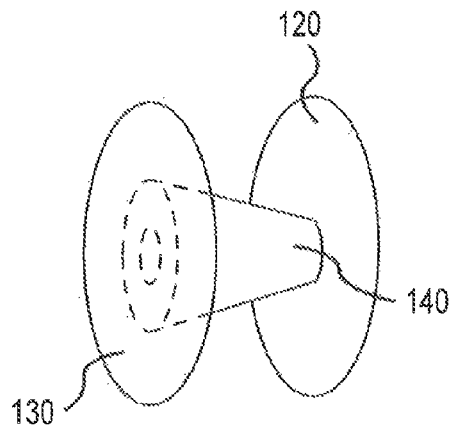
FIG. 17A illustrates a perspective view of a textile reel according to various embodiments.
Figure 17B:
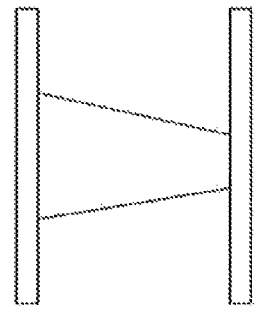
FIG. 17B illustrates a side view of a textile reel with a tapered barrel according to various embodiments.
Figure 17C:
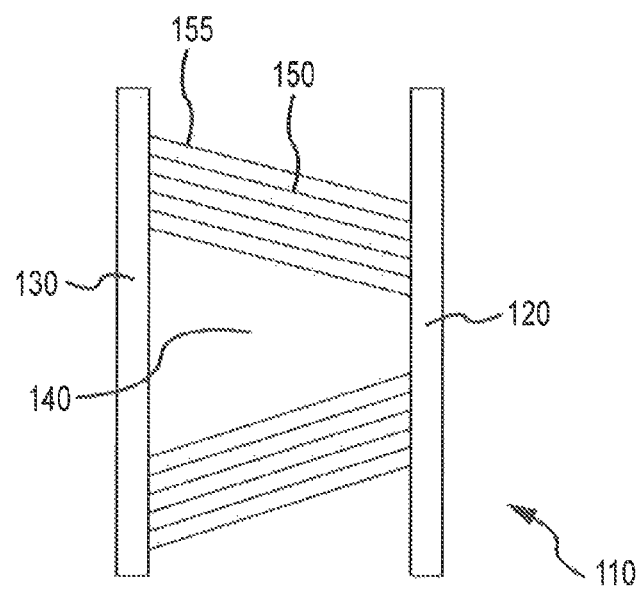
FIG. 17C illustrates a sectional side view of a textile reel with a spiral textile wound around a barrel of the textile reel.
Figure 18:
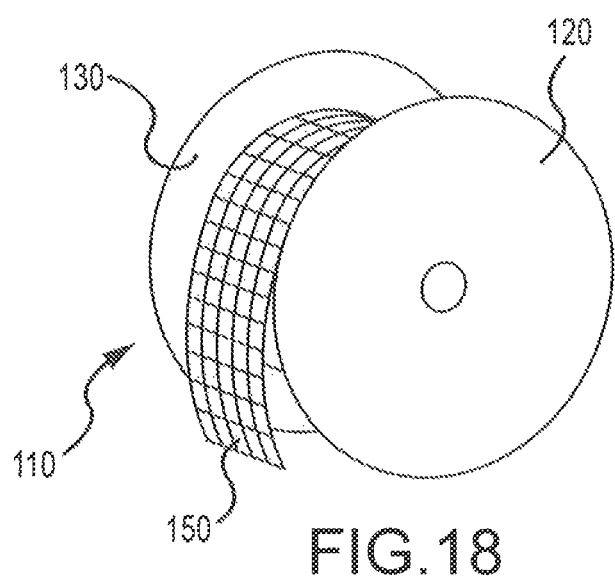
FIG. 18 illustrates a perspective view of a textile reel with a wound spiral textile according to various embodiments.

According to various embodiments, and with reference to FIGS. 17A-17C, a spool 110 facilitates substantially maintaining the shape and weave of a spiral textile tape 150 both when the textile 150 is wound around a barrel 140 of spool 110 as it is received from the first loom and as the textile tape is unwound from the spool 110 and layered in the second loom to create a circular preform.

For a textile having a straight shape—i.e., the textile lies in a straight line—a standard spool may be used to receive the textile from the first loom. For example, a standard spool may comprise a cylinder that receives the straight textile. However, a spiral textile tape according to various embodiments has a helical shape—i.e., when a spiral tape is flat, it falls in a circle and not a straight line. Therefore, a cylinder may not sufficiently receive a spiral textile tape without distorting the weave and/or shape of the spiral textile tape.

Thus, according to various embodiments, and with reference to FIG. 17C, a spool 110 that receives a spiral textile tape 150 comprises a substantially conical section 140. For example, a frustum of a cone may be disposed between two hubs 120, 130, and the frustum of a cone may receive the spiral textile 150. The frustum may have different characteristics depending on the curvature, inside diameter, outside diameter, weave or other structure or characteristic of the spiral textile. The spool 110 with the cone section 140 may maintain the overall geometry of the spiral tape 150 as well as the fiber orientation following weaving of the tape in the first loom. For example, the cone section 140 may be tapered such that the textile tape 150 may be wound around cone section 140 in a manner that orients a face 155 of textile 150 such that textile face 55 is substantially parallel to cone section 140.

According to various embodiments, each reel holds sufficient textile tape for at least a single preform. In this manner, less space is required to maintain the spiral textile tape near the circular needle loom, because the reel is sized appropriately for the preform that is being created. However, limiting the storage to an amount of spiral textile tape for a single preform facilitates may reduce distortion of the textile fibers. Also, segmenting the textile tape into individually-sized reels facilitates automation of the preform manufacturing process. For example, multiple reels may be loaded automatically or manually into a feed device proximate the circular needle room, and one reel may be loaded for each preform needling process. Additionally, in various embodiments, each reel may hold sufficient tape for a plurality of preforms, or multiple reels may be utilized for a single preform.

In accordance with various embodiments, substantially vertical reels 110 may be utilized to wind the spiral tape 150 from a narrow tape needle loom. As the weaving process is progressing, the spiral tape 150 is wound from the narrow tape needle loom onto conical barrel 140 of reel 110. Reel 110 may then be transported to a substantially vertical position above a circular bed plate of a needle punch loom and/or a circular needle loom. Such a method facilitates moving and storing a woven spiral tape substantially without distortion and in a more simplified path from the reel to the circular bed plate. Furthermore, with reference to FIG. 19, reel 110 may be located closer to circular needle loom 160 than prior art spiral textile storage mechanisms. For example, textile tape 150 is advantageously oriented on reel 110 so that it may be directly layered on circular needle loom 160 without reorienting textile tape 150. This configuration overcomes difficulties associated with prior art reels where the tape exits a reel and is then fed through a complex path to reorient the textile tape with respect to a circular needle loom.

In accordance with various embodiments, the textile tape may be routed from one reel to another, either manually or automatically (e.g., using a robot) during which process the tape may be cut, such as by "kiss-cutting," to facilitate cutting short fibers at the surface of tape to enable transfer of the short fibers in the z direction with respect to the tape. Such a cutting process is described in more detail in U.S. patent application Ser. No. 12/536,649 entitled, "METHOD AND SYSTEM FOR ENABLING Z FIBER TRANSFER IN NEEDLED PREFORM" (filed on Aug. 6, 2009), the entirety of which is incorporated herein by reference. For example, a first reel may be located proximate a narrow tape needle loom, and the textile may be wound around the first reel as the weaving process is progressing. Then the textile may be unwound from the first reel and wound around a second reel proximate the circular needle loom. The cutting may occur between the first reel and the second reel.

According to various embodiments, and with reference to FIGS. 17A-17C and 18, a reel 110 for a spiral textile 150 comprises opposing hubs 120 and 130 and a barrel 140 disposed the hubs. Barrel 140 may be in the shape of a frustum of a cone. For example, the end of barrel 140 that is proximate hub 120 may comprise one diameter, and the end of barrel 140 that is proximate hub 130 may comprise a larger or smaller diameter. In various embodiments, barrel 140 may have any geometry that advantageously facilitates winding a spiral textile tape 150 about barrel 140 in a manner that maintains a weave and shape of the textile tape 50.

Figure 19:
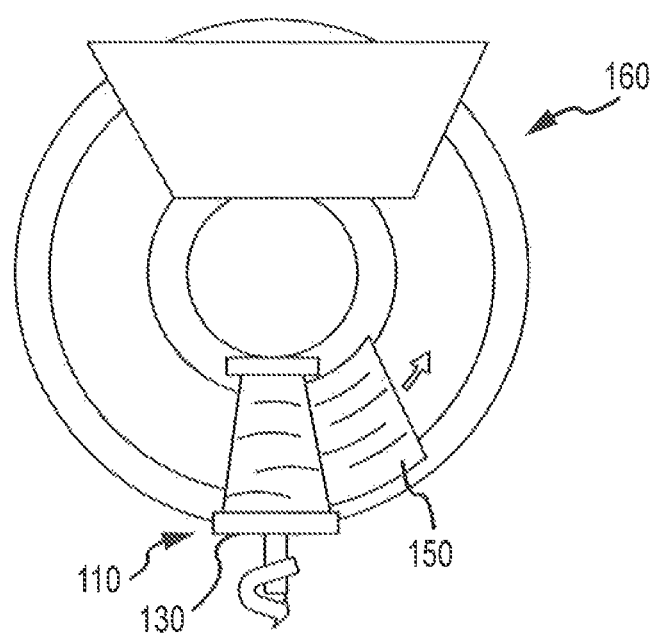
FIG. 19 illustrates a perspective view of textile reel with a wound spiral textile positioned proximate a circular needle loom according to various embodiments.

In various embodiments, and with reference also to FIG. 19 reel 110 may further facilitate unwinding textile 150 from barrel 140 onto a circular needle punch loom bed plate 160. Textile 150 includes a face 155 that is disposed in a substantially parallel manner to barrel 140. Bed plate 160 also receives face 155 of textile tape 150 in a substantially parallel fashion such that textile tape 150 lies substantially flat on bed plate 160. Because face 155 of textile tape 150 is substantially parallel to barrel 140 of reel 110 and to bed plate 160 of a circular needle punch loom, reel 110 may be disposed close to bed plate 160 and substantially vertically with respect to bed plate 160. This configuration facilitates reducing space required for routing textile tape 150 to bed plate 160. Further, such configurations overcome difficulties associated with prior art reels because reel 110 facilitates orienting textile tape 150 close to a circular needle loom because it is not necessary to reorient the textile tape prior to layering it on the circular needle loom.

Figure 20:
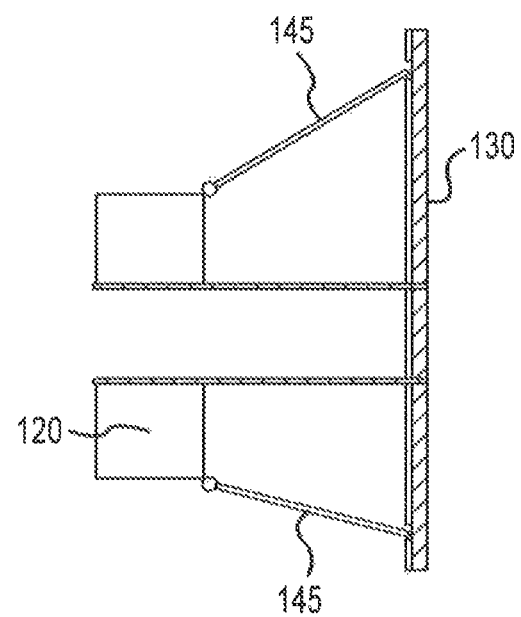
FIG. 20 illustrates a side view of a textile reel with articulated elements hinged to a hub according to various embodiments.
Figure 21A:
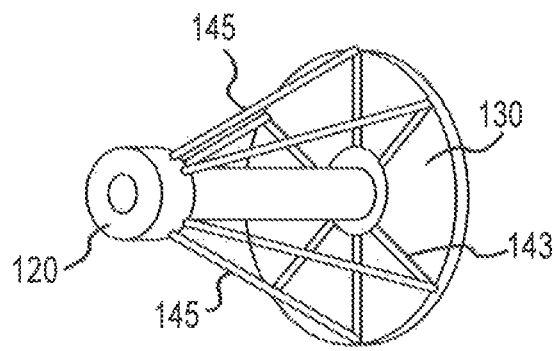
FIG. 21A illustrates a perspective view of a textile reel with articulated elements hinged to a first hub and disposed in radial elements of a second hub according to various embodiments.
Figure 21B:
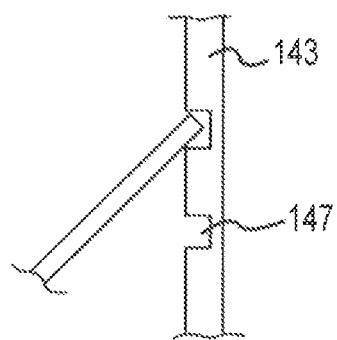
FIG. 21B illustrates a sectional view of an articulated element nesting at a second hub of the textile reel according to various embodiments.

In various embodiments, reel 110 advantageously winds and dispenses spiral textile tapes having different dimensions, such as ODs and IDs, different weaving patterns, and various other different characteristics. For example, with respect to FIGS. 20 and 21A-21B, reel 110 may be advantageously adaptable to different types of spiral tapes as discussed below.

According to various embodiments, reel 110 comprises a first hub 120, which includes a plurality of articulated elements 145 that are rotatably attached to and/or associated with first hub 120. Second hub 130 includes a plurality of radial elements 143 that extend from the center of second hub 130 to the outside of second hub 130. Radial elements 143 contain slots 147 that receive articulated elements 145. Radial elements 143 each include a plurality of slots 147 to advantageously provide a number of positions wherein articulated elements 145 may be located. Articulated elements 145 may be moved from one slot 147 to another slot 147 on radial element 143 in order to increase or decrease the angle of articulated element 147 with respect to first hub 120 and second hub 130.

Collectively, articulated elements 145 may function as barrel 140 (discussed above) about which a textile tape may be wound, stored, and then unwound. As such, articulated elements 145 may be referred to as barrel elements to describe the functionality of elements 145. Depending on the geometry, weave, composition and/or other characteristics of the spiral textile, barrel elements 145 may be moved from one slot 147 to another slot 147 to facilitate receiving the textile tape.

In accordance with various embodiments, any number of articulated elements 145, radial elements 143, and slots 147 may be utilized to accommodate a variety of textile types, shapes, geometries and the like. Collectively, articulated elements 145 may provide a surface upon which a spiral textile tape may be wound. For example, collectively, articulated elements 145 may form a substantially frusto-conical surface that receives the spiral textile tape. In various embodiments, articulated elements may form a triangle, square, pentagonal, octagonal and the like structures to receive the spiral textile in an orientation that facilitates directly deploying the spiral textile on a circular needle loom, without a need for reorienting the textile tape with respect to the circular needle loom.

Although this disclosure illustrates and describes various embodiments, equivalents and modifications will occur to others who are skilled in the art upon reading and understanding of the disclosure. Various embodiments include all such equivalents and modifications, and is limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A helical textile comprising:
   warp fibers spaced in a weft direction;
   first weft fibers spaced in a warp direction and extending from a first edge of the textile to a second edge of the textile;
   second weft fibers shorter than the first weft fibers, wherein the first weft fibers and the second weft fibers alternate in the warp direction, and wherein the second weft fibers extend from the first edge and are secured at the first edge of the textile; and
   a plurality of knitted loops along the first edge, wherein the plurality of knitted loops formed with a binder thread secures at least the first weft fibers at the first edge, wherein the binder thread is not one of the warp fibers.

2. The textile of claim 1, further including a substantially uniform weft fiber concentration from the first edge to the second edge.

3. The textile of claim 1, further including a content of weft fibers near the first edge that is higher than a content of weft fibers near the second edge, wherein a thickness of the textile is substantially constant.

4. The textile of claim 1, wherein the warp fibers and the weft fibers include carbon or graphite tows at least one of equal to and greater than 6K.

5. The textile of claim 1, wherein the warp fibers and the weft fibers include carbon or graphite tows of at least one of 6K, 12K, 24K, 48K, and 50K.

6. The textile of claim 5, wherein the warp fibers and the first weft fiber are interlaced to form at least one of a plain weave, a twill weave, and a satin weave.

7. The textile of claim 1, further comprising third weft fibers, fourth weft fibers, fifth weft fibers, sixth weft fibers, seventh weft fibers, and eighth weft fibers, wherein the first, second, third, fourth, fifth, sixth, seventh, and eighth weft fibers all have different lengths in order to obtain a tailorable fiber architecture.

8. The textile of claim 1, further comprising third weft fibers having a different length than the first weft fibers and the second weft fibers.

9. The textile of claim 1, further comprising a selvedge edge proximate at least one of the first edge of the textile and the second edge of the textile.

10. The textile of claim 1, further comprising a radial to circumferential fiber content ratio between the first edge and the second edge of between about 2 and about 4.

11. A helical textile, comprising:
    warp fibers spaced in a weft direction;
    first weft fibers spaced in a warp direction and extending from a first edge of the textile to a second edge of the textile;
    second weft fibers shorter than the first weft fibers;
    the first edge having a first fiber concentration and the second edge having a second fiber concentration;
    wherein the first weft fibers and the second weft fibers alternate in the warp direction, and wherein the second weft fibers are secured at the first edge of the textile.

12. The textile of claim 11, wherein the first fiber concentration and the second fiber concentration are substantially uniform.

13. The textile of claim 11, further comprising a third fiber concentration substantially uniform with the first fiber concentration and the second fiber concentration.

14. The textile of claim 11, wherein the first fiber concentration is greater than the second fiber concentration, and wherein the first edge is proximate an outside diameter of the textile.

15. A helical textile, comprising:
    warp fibers spaced in a weft direction;
    first weft fibers spaced in a warp direction and extending substantially across a width of the textile;
    second weft fibers shorter than the first weft fibers, wherein the first weft fibers and the second weft fibers alternate in the warp direction, wherein respective ends of the second weft fibers are proximate an edge of the textile; and
    a selvedge proximate an outside diameter of the textile, wherein the selvedge comprises a plurality of knitted loops along the first edge, wherein the plurality of knitted loops formed with a binder thread secures at least the first weft fibers at the first edge and act as reference point for the first and second weft fibers, wherein the binder thread is not one of the warp fibers.

16. A method for manufacturing a spiral-shaped textile comprising:
    inserting first weft fibers in warp fibers of the textile, wherein the first weft fibers extend from a first edge of the textile to a second edge of the textile;
    knitting the first weft fibers at the first edge of the textile to create a first knit;
    inserting second weft fibers in the warp fibers of the textile, wherein the second weft fibers extend from the first edge of the textile to a point between the first edge of the textile and the second edge of the textile;
    securing the second weft fibers with a binder thread that is not one of the warp fibers, at the first edge of the textile; and
    knitting the second weft fibers at the first edge of the textile to create a second knit.

17. A method for manufacturing a spiral-shaped textile comprising:
    inserting first weft fibers in warp fibers of the textile using a first weft needle, wherein the first weft fibers extend from a second edge of the textile to a first edge of the textile;
    knitting the first weft fibers at the first edge of the textile to create a first knit;
    inserting second weft fibers in the warp fibers of the textile using a second weft needle, wherein the second weft fibers extend from the first edge of the textile to a point between the first edge of the textile and the second edge of the textile;
    securing the second weft fibers with a binder thread that is not one of the warp fibers, at the first edge of the textile; and
    looping the second weft fibers about the first edge of the textile.

* * * * *